United States Patent
Järmyr et al.

(10) Patent No.: US 10,340,993 B2
(45) Date of Patent: Jul. 2, 2019

(54) MASKED BEAMFORMING

(71) Applicant: Telefonaktiebolaget LM Ericsson (publ), Stockholm (SE)

(72) Inventors: Simon Järmyr, Skarpnäck (SE); George Jöngren, Sundbyberg (SE); Niklas Wernersson, Kungsängen (SE); Sebastian Faxér, Järfälla (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 127 days.

(21) Appl. No.: 15/525,116

(22) PCT Filed: Sep. 25, 2015

(86) PCT No.: PCT/SE2015/051012
§ 371 (c)(1),
(2) Date: May 8, 2017

(87) PCT Pub. No.: WO2016/048231
PCT Pub. Date: Mar. 31, 2016

(65) Prior Publication Data
US 2017/0310376 A1     Oct. 26, 2017

Related U.S. Application Data

(60) Provisional application No. 62/076,565, filed on Nov. 7, 2014, provisional application No. 62/056,244, filed (Continued)

(51) Int. Cl.
*H04B 7/06* (2006.01)
*H04B 7/04* (2017.01)
(Continued)

(52) U.S. Cl.
CPC .......... *H04B 7/0617* (2013.01); *H04B 7/043* (2013.01); *H04B 7/0469* (2013.01);
(Continued)

(58) Field of Classification Search
USPC ......................................................... 370/335
See application file for complete search history.

(56) References Cited

U.S. PATENT DOCUMENTS

| | | |
|---|---|---|
| 2001/0005395 A1 | 6/2001 | Jin |
| 2005/0176468 A1* | 8/2005 | Iacono ................ H04B 7/0689 455/562.1 |

(Continued)

FOREIGN PATENT DOCUMENTS

| | | |
|---|---|---|
| WO | 2014107012 A1 | 7/2014 |
| WO | 2014137043 A1 | 9/2014 |
| WO | 2014142713 A1 | 9/2014 |

OTHER PUBLICATIONS

International Search Report and Written Opinion for PCT/SE2015/051012, dated Nov. 25, 2015, 12 pages.
(Continued)

*Primary Examiner* — Mark H Rinehart
*Assistant Examiner* — Kenneth P Hunt
(74) *Attorney, Agent, or Firm* — Sage Patent Group

(57) ABSTRACT

There is disclosed a method of operating a transmitter arrangement for a wireless communication network, the transmitter arrangement adapted for beamforming. The method comprises determining a maximum power level mask for the power of transmission and/or beams in a critical angular interval, the maximum power level mask covering at least the critical angular interval and controlling beamforming based on the maximum power level mask.

10 Claims, 26 Drawing Sheets

Related U.S. Application Data on Sep. 26, 2014, provisional application No. 62/056,222, filed on Sep. 26, 2014.

(51) Int. Cl.
    *H04L 1/06*     (2006.01)
    *H04W 52/42*     (2009.01)
    *H04B 7/0426*     (2017.01)
    *H04B 7/0456*     (2017.01)
    *H04W 52/36*     (2009.01)

(52) U.S. Cl.
    CPC ......... *H04B 7/0691* (2013.01); *H04L 1/0668* (2013.01); *H04W 52/367* (2013.01); *H04W 52/42* (2013.01)

(56) References Cited

U.S. PATENT DOCUMENTS

| | | | | |
|---|---|---|---|---|
| 2012/0163236 | A1* | 6/2012 | Kim | H04L 25/03898 370/254 |
| 2013/0090126 | A1* | 4/2013 | Xing | H04B 7/0617 455/452.1 |
| 2013/0230081 | A1 | 9/2013 | Wernersson et al. | |
| 2015/0222345 | A1* | 8/2015 | Chapman | H04B 7/0617 370/332 |
| 2016/0013848 | A1* | 1/2016 | Wernersson | H04B 7/0617 370/329 |
| 2016/0262077 | A1* | 9/2016 | Zhang | H04W 24/08 |
| 2017/0310376 | A1* | 10/2017 | Jarmyr | H04B 7/0469 |
| 2018/0020363 | A1* | 1/2018 | Faxer | H04L 5/005 |

OTHER PUBLICATIONS

International Preliminary Report on Patentability for PCT/SE2015/051012, dated Apr. 6, 2017, 9 pages.

* cited by examiner

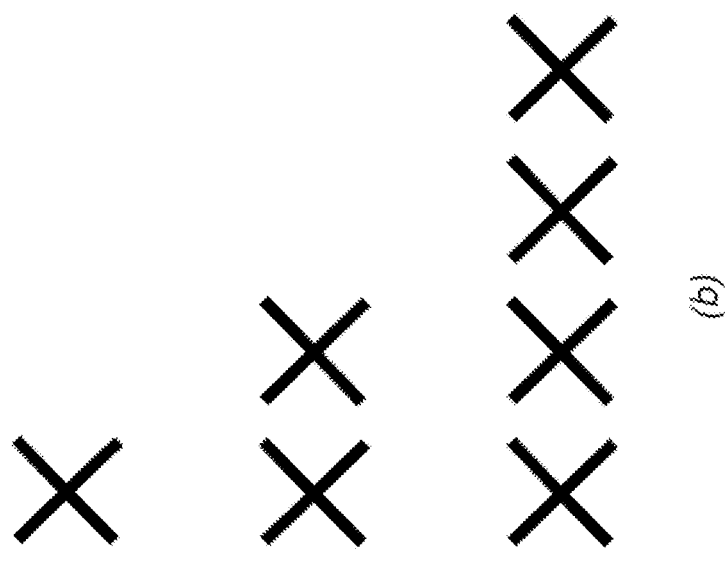
Figure 2

US 10,340,993 B2

MASKED BEAMFORMING

This application is a 35 U.S.C. § 371 national phase filing of International Application No. PCT/SE2015/051012, filed Sep. 25, 2015, which claims priority to U.S. Provisional Application No. 62/076,565, filed Nov. 7, 2014, U.S. Provisional Application No. 62/056,244, filed Sep. 26, 2014, and U.S. Provisional Application No. 62/056,222, filed Sep. 26, 2014, the disclosures of which are incorporated herein by reference in their entireties.

TECHNICAL FIELD

The present disclosure generally pertains to beamforming in a wireless communication network.

BACKGROUND

Beamforming is an important approach to improve communication quality and to save power in wireless communication networks. With increasing number of user equipments communicating, respectively the increased density of signaling, improvements to beamforming approaches are advantageous.

SUMMARY

An object of the present disclosure is to provide improved approaches to beamforming in the context of wireless communication networks.

There is disclosed a method of operating a transmitter arrangement for a wireless communication network. The transmitter arrangement is adapted for beamforming. The method comprises determining a maximum power level mask for the power of transmission and/or beams in a critical angular interval, the maximum power level mask covering at least the critical angular interval, wherein the method further comprises controlling beamforming based on the maximum power level mask.

There is also disclosed a transmitter arrangement for a wireless communication network, the transmitter arrangement being adapted for beamforming. The transmitter arrangement is further adapted for determining a maximum power level mask for the power of transmission and/or beams in a critical angular interval, the maximum power level mask covering at least the critical angular interval. The transmitter arrangement is also adapted for controlling beamforming based on the maximum power level mask.

Moreover, there is disclosed a method of operating a user equipment for a wireless communication network. The method comprises receiving an indication of a restricted codebook and transmitting a recommendation for beamforming to the network, the recommendation being based on the restricted codebook.

A user equipment for a wireless communication network is also disclosed. The user equipment is adapted for receiving an indication of a restricted codebook. Furthermore, the user equipment is adapted for transmitting a recommendation for beamforming to the network, the recommendation being based on the restricted codebook.

A program product comprising code executable by control circuitry is suggested, the code causing the control circuitry to carry out and/or control any of the methods described herein.

Moreover, there is disclosed a carrier medium carrying and/or storing a program product as described herein and/or code executable by control circuitry, the code causing the control circuitry to perform and/or control any of the methods described herein.

The approaches herein allow adapting the angular power distributed by a transmitter arrangement to requirements or operation conditions, and in particular allow limiting the power to a mask, which facilitates limiting interference.

BRIEF DESCRIPTION OF THE DRAWINGS

The figures in the drawings are provided to illustrate specific approaches and concept, and are not intended to limit the scope of the approaches and ideas presented. In the drawings.

FIGS. 2 (a) and (b) show illustrations of (a) 1 Tx, 2 Tx and 4 Tx co-polarized antenna arrays and (b) 2 Tx, 4 Tx and 8 Tx cross-polarized antenna arrays;

DETAILED DESCRIPTION

Figure 1:
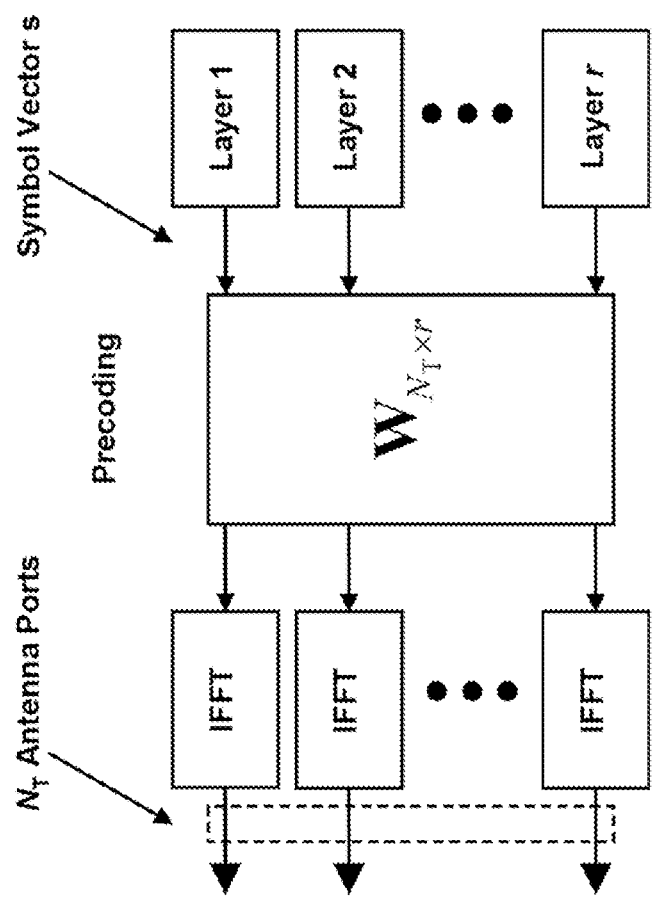
FIG. 1 shows a transmission structure of precoded spatial multiplexing mode in LTE.

Note that although terminology from 3GPP LTE has been used in this disclosure to exemplify the, this should not be seen as limiting the scope of the discussed concept to only the aforementioned system. Other wireless systems, including WCDMA, WiMax, UMB and GSM, may also benefit from exploiting the ideas covered within this disclosure.

Also note that terminology such as eNodeB and UE should be considering nonlimiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the discussed concept is equally applicable in the uplink. In particular, "eNodeB" or device 1 are used as examples and/or representing any transmitter arrangement adapted for beamforming as described herein, whereas a UE may be considered as example or to be representing a device adapted for receiving beam formed transmissions from such a transmitter arrangement, e.g. a terminal. A transmitter arrangement generally may comprise control circuitry and/or radio circuitry and/or an antenna arrangement or antenna array, which may comprise antennas or antenna elements or subelements, adapted for beamforming. A transmitter arrangement may represent a network side, whereas a UE may represent a terminal side.

There is disclosed a method of operating a transmitter arrangement for a wireless communication network. The transmitter arrangement is adapted for beamforming. The method comprises determining a maximum power level mask for the power of transmission and/or beams in a critical angular interval, the maximum power level mask covering at least the critical angular interval, wherein the method further comprises controlling beamforming based on the maximum power level mask.

There is also disclosed a transmitter arrangement for a wireless communication network, the transmitter arrangement being adapted for beamforming. The transmitter arrangement is further adapted for determining a maximum power level mask for the power of transmission and/or beams in a critical angular interval, the maximum power level mask covering at least the critical angular interval. The transmitter arrangement is also adapted for controlling beamforming based on the maximum power level mask.

Moreover, there is disclosed a method of operating a receiving device like a user equipment for a wireless communication network. The method comprises receiving an indication of a restricted codebook and transmitting a recommendation for beamforming to the network, the recommendation being based on the restricted codebook.

A receiving device like a user equipment for a wireless communication network is also disclosed. The receiving device or user equipment is adapted for receiving an indication of a restricted codebook. Furthermore, the receiving device or user equipment is adapted for transmitting a recommendation for beamforming to the network, the recommendation being based on the restricted codebook.

Transmitting a recommendation may comprise determining a recommendation, e.g. based on measurements (which may be performed by the receiving device or UE) and/or control signaling (e.g., received from a network or network node) and/or operation conditions (e.g., interference conditions, and/or operation requirements, e.g. quality of service, and/or SIR/SINR/SNR conditions, etc.) A receiving device or user equipment may comprise a determining module for determining a recommendation and/or a transmitting module for transmitting a recommendation.

Controlling beamforming may be based on a codebook. The transmitter arrangement may comprise a controlling module for such controlling. Controlling beamforming may generally comprise determining a codebook and/or be based on a determined codebook. The codebook may be a restricted codebook.

A codebook generally may define and/or include one or more sets of beams for beamforming, e.g. in terms of direction power distribution, and/or in terms of amplitude and/or phase and/or (virtualized and/or antenna) port/s to be addressed for producing the beam/s. A codebook may be provided for a transmitter side and/or a receiver side. Precoding (for beamforming) may be performed based on a codebook.

Additionally or alternatively, controlling beamforming may be based on a restricted codebook, wherein the restricted codebook may be determined based on the maximum power level mask.

Determining a codebook, in particular a restricted codebook, based on a mask may generally comprise determining the codebook such that it conforms with the mask and/or fulfills the requirements of the mask, in particular regarding an angular distribution, e.g. of power like transmission power. Determining may include obtaining, e.g. receiving, a corresponding codebook, e.g. from another network node, e.g. a higher-level network node, and/or determining by the transmitter arrangement itself, e.g. based on a stored codebook and/or information obtained from one or more user equipments, e.g. at least one recommendation and/or measurement results, and/or operation conditions, e.g. load and/or quality of service requirements. Determining a restricted codebook may comprise modifying a predetermined codebook, in particular limiting it in terms of number of beams (e.g., removing/subtracting on or more beams) and/or the power of one or more beams (e.g., lowering the allowed maximum power and/or the power prescribed by the codebook to be restricted), and/or modifying the direction (elevation and/or horizontal). A representation of predetermined codebook may be stored accessible for a transmitter arrangement and/or user equipment. A transmitter arrangement may be adapted for determining a restricted codebook and/or comprise a determining module for such determining. Controlling beamforming based on a codebook may generally comprise performing and/or controlling beamforming such that the beams conform to beams defined and/or included in the codebook.

Alternatively or additionally, a restricted codebook may be indicated to a user equipment or receiving device. Such indicating may comprise transmitting a signal indicative of the restricted codebook to the user equipment, e.g. indicating parameters describing and/or parametrizing the restricted codebook and/or available beams. A transmitter arrangement may comprise a codebook indication module for such indicating. The restricted codebook may be a restricted codebook determined by the transmitter arrangement.

It may be considered that controlling beamforming is based on a recommendation received from a receiving device or user equipment, wherein the recommendation may be based on a restricted codebook. A recommendation may comprise an indication of a preferred beam or set of beams and/or corresponding parameters (e.g., power, direction/angles/elevation/horizontal angle, phase, etc.), and as such may be referred to as recommendation for beamforming. It may be considered that a recommendation is transmitted, e.g. by the UE, utilizing a suitable signal carrying the indication.

Generally, a transmitter arrangement may combine the functionalities associated to any of the transmitter arrangements described herein with the functionalities of any of the receiving device and/or user equipments described herein.

A program product comprising code executable by control circuitry is suggested, the code causing the control circuitry to carry out and/or control any of the methods described herein.

Moreover, there is disclosed a carrier medium carrying and/or storing a program product as described herein and/or code executable by control circuitry, the code causing the control circuitry to perform and/or control any of the methods described herein.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

Herein it is referred to an antenna arrangement or a multiple antenna system as a system wherein an eNodeB has access to multiple physical antenna ports (or virtualization thereof, which may be called virtual antenna ports); for example a vertical linear array of antenna elements, and/or multiple sub-elements within a single active antenna.

The LTE standard is currently evolving with enhanced MIMO support. A core component in LTE is the support of MIMO antenna deployments and MIMO related techniques. For instance there is in LTE-Advanced support for a spatial multiplexing mode with possibly channel dependent precoding. The spatial multiplexing mode is aimed for high data rates in favorable channel conditions. An illustration of the spatial multiplexing operation is provided in FIG. 1, which shows a transmission structure of precoded spatial multiplexing mode in LTE.

As seen, the information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is modeled by $$y_n = H_n W_{N_T \times r} s_n + e_n$$

where $e_n$ is a noise/interference vector obtained as realizations of a random process and $H_n$ represents the $N_R \times N_T$ MIMO channel. The precoder $W_{N_T \times r}$ can be a wideband precoder, which is constant over frequency, or frequency selective.

On the network side, transmitter arrangements and/or base stations like an eNodeB are often equipped with multiple antennas to be used for reception and transmission. The antennas intended for a cell, and/or a sector, form a so-called antenna array. Some typical antenna array constellations are illustrated in FIGS. 2(a) and 2(b). For instance, one common antenna array layout is to use co-polarized antennas in order to construct antenna arrays as shown in FIG. 2(a). Furthermore, another common layout is to instead use cross-polarized antennas as shown in FIG. 2(b).

Figure 3:
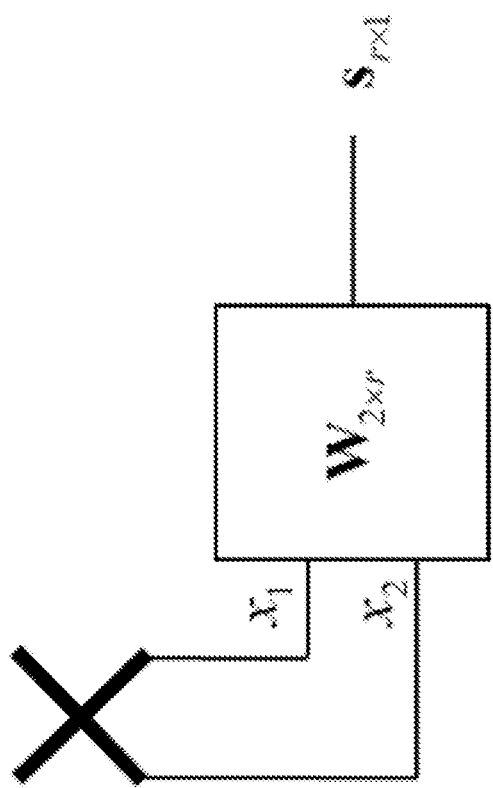
FIG. 3 shows illustrations of codebook based precoding based with a 2 Tx cross-polarized antenna array.

In particular, FIGS. 2 (a) and (b) show illustrations of (a) 1 Tx, 2 Tx and 4 Tx co-polarized antenna arrays and (b) 2 Tx, 4 Tx and 8 Tx cross-polarized antenna arrays. Using for instance a 2 Tx cross-polarized antenna array (c.f. the top most antenna setup in FIG. 2 (b)) implies that the antenna array is fed with two signals, $x_1$ and $x_2$. This is illustrated in FIG. 3, where it has been assumed that a 2 Tx antenna array is used with codebook based precoding and thus $x_{2 \times 1} = W_{2 \times r} s_{r \times 1}$ holds. FIG. 3 shows illustrations of codebook based precoding based with a 2 Tx cross-polarized antenna array.

Figure 4:
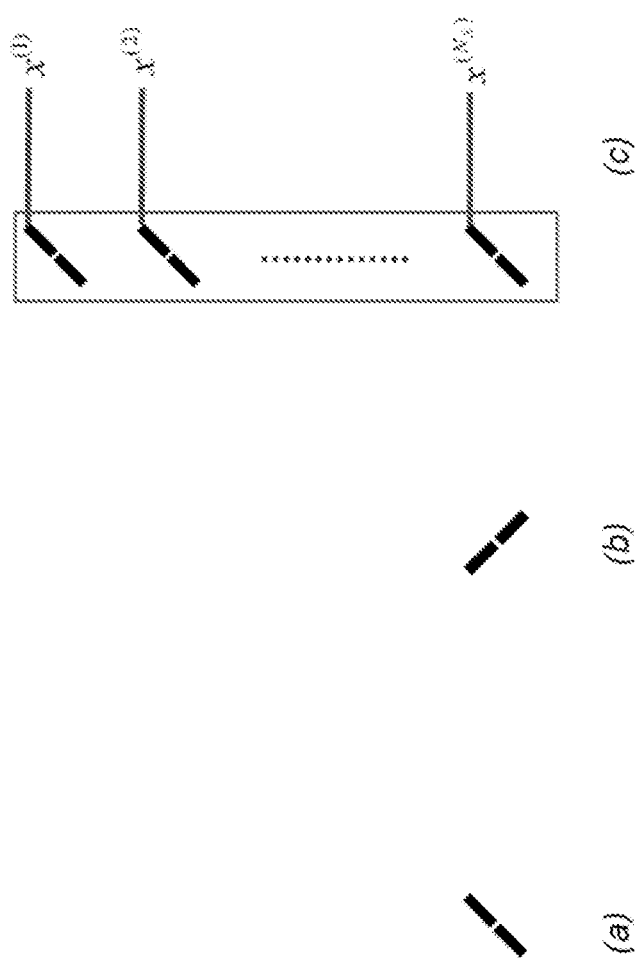
FIGS. 4 (a), (b) and (c) show illustrations of (a) a subelement, (b) a subelement in the polarization orthogonal to the polarization of the subelement in (a) and, (c) an active antenna.

An active antenna may consist of a number of subelements that jointly form the antenna. In FIG. 4 (a) a subelement, which in practice may be realized by a physical device, is illustrated. Each subelement will have a polarization direction which potentially can be orthogonal to another subelement's polarization. This is illustrated in FIG. 4 (b) where a subelement with orthogonal polarization compared to the subelement in FIG. 4 (a) is shown. Finally, in FIG. 4 (c), an active antenna array which consists of $N_S$ subelements is shown. In general, but not necessarily, all the subelements of an active antenna may be of the same polarization. Note that each given subelement i can be fed the given signal $x^{(i)}$ not necessarily equal to $x^{(j)}$. Generally, the concept of a subelement is intended to be nonlimiting in the sense that the term may refer to any virtualization (e.g., linear mapping) of one or more physical antenna subelements. For example, pairs of physical sub-elements could be fed the same signal, and hence share the same virtualized sub element antenna port.

In this document, when dealing with more than one active antenna, the notation $x_i^{(j)}$ will be adopted when referring to a signal, or function, related to the j:th subelement in the i:th antenna. These indexes will however be omitted when it is clear from the context what is being referred to.

Figure 5:
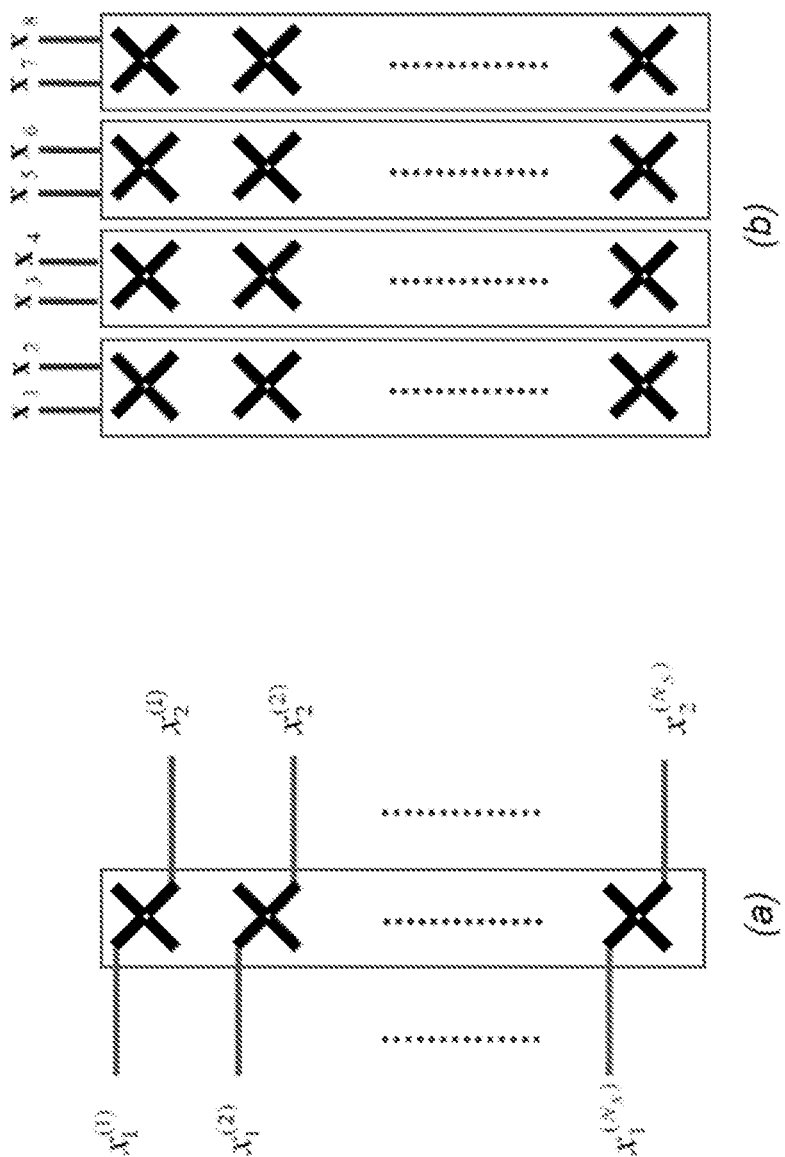
FIGS. 5 (a) and (b) show illustrations of (a) a 2 Tx active antenna array and (b) an 8 Tx active antenna array.

By combining two active antennas of different polarizations, as illustrated in FIG. 5 (a), an active antenna array can be created and fed with two different signals, $x_1$ and $x_2$ where $x_i = [x_i^{(1)} \ldots x_i^{(N_S)}]^T$. Furthermore, by combining multiple antenna arrays, as illustrated in FIG. 5 (b), other active antenna arrays can be created. Here the signals $x_i^{(j)}$ are no longer explicitly shown but they are still assumed to be present in the same manner as in FIG. 5 (a). Specifically, FIG. 5 shows illustrations of (a) a 2 Tx active antenna array and (b) an 8 Tx active antenna array.

Beamforming is described as follows. Beamforming is a technique for directional signal transmission and/or reception. This is achieved by controlling the phase and amplitude of different signals transmitted from and/or received from spatially separated antenna elements. This can be done by for instance using an antenna array with multiple ports or an active antenna with multiple sub-elements.

Some form of information related to the radio channel is typically needed in order to perform efficient beamforming. Channel state information (CSI) is given either in explicit or implicit form. Explicit CSI contains gain and phase-difference between all pairs of transmit and receive antennas, and implicit CSI is typically given by spatial precoder selections from the UE.

Beamforming is commonly performed so as to maximize the received power at the UE. Certain beamforming techniques have other objectives in addition to boosting the received signal power, for instance to remove or reduce the interference. Two examples of such objectives are the zero-forcing criterion, and the signal to leakage plus noise objective function.

Beamforming using implicit CSI is often more limiting in interference suppression capabilities since the complete channel is not known at the eNodeB. The straightforward beamformer would be to use the one recommended by the UE, although adjustments of the beamformer to reduce the interference is conceivable. A special type of implicit CSI is beam selection feedback. The eNodeB transmit a plethora of spatially distinct probing signals that are beamformed in specific directions. A UE is then instructed to select the most preferred beam, for instance in terms of received signal power, and report this to the eNodeB. The advantage of this type of feedback is that the number of antenna elements can be decoupled from the CSI feedback; the UE need not estimate the full channel matrix. However, it should be pointed out that even if beam selection feedback is appropriate for a dynamic beam selection system also other kinds of implicit CSI, or explicit CSI, can be used in a dynamic beam selection system.

Elevation beamforming is described as follows. As previously stated one way to perform beamforming is to use active antennas. Furthermore, in the case that the active antenna is mounted in such a way that the subelements are spread out on a vertical axis one possible beamforming technique is "elevation beamforming" meaning that the transmitted and/or received signal is directed in the elevation domain. This is done by using different phases and amplitudes for the different subelements of the active antenna such that at certain angles, relative the active antenna's vertical axis, the different signals experience constructive interference whereas at other angles they experience destructive interference. In this disclosure, "elevation beamforming" is exclusively used as a dynamic beam-selection technique in the sense that an eNodeB using elevation beamforming may use different elevation beams to serve different UEs. Elevation beamforming may be component of the more general case of joint elevation-azimuth beamforming from a two-dimensional antenna array.

Figure 6:
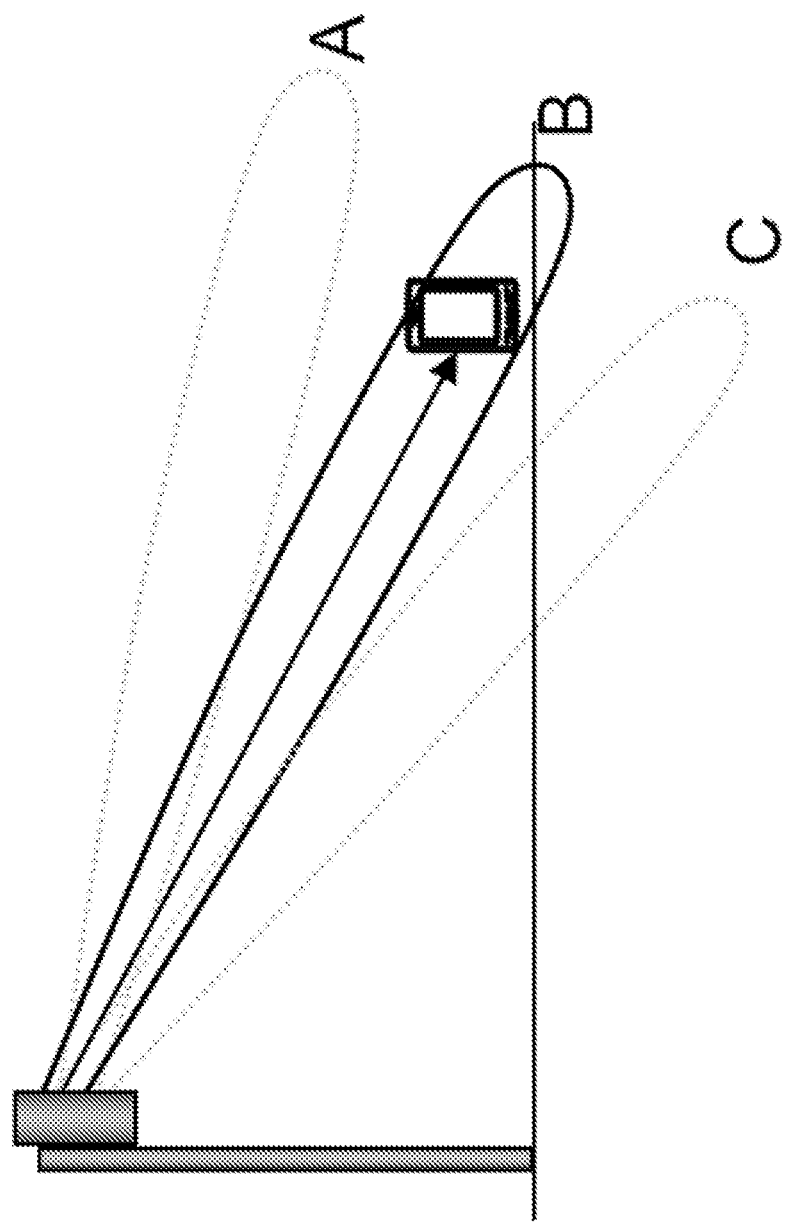
FIG. 6 shows dynamic elevation beam selection.

One example, in the case of transmission, is illustrated in FIG. 6. As can be seen, the eNodeB is able to dynamically perform beam selection between three different beams, beams A-C. Furthermore, when the eNodeB is transmitting to the illustrated UE the choice of using beam B has the advantage that the transmitted energy will be directed in the same direction as the propagation path between the eNodeB and the UE. This hence leads to that the UE receives a stronger signal from the eNodeB. In the case of a static beamformer the eNodeB would instead need to use one beam for all transmissions and therefore not be able to focus the transmitted power in the direction towards its UE of interest.

It should be emphasized that in a more general setting there can be any number of selection beams. In fact, the used transmission beams can even be created dynamically pointing in an arbitrary elevation direction and with an arbitrary shape (e.g., width) implying an infinite number of possible beams.

While beamforming techniques can be used by an eNodeB or any transmitter suitably adapted for transmitting various control signals as well as data signals, this disclosure refers to the latter unless explicitly stated otherwise. The particular set of elevation beams used for transmitting data by means of dynamic elevation beamforming will be referred to as data transmission beams.

Figure 7A:
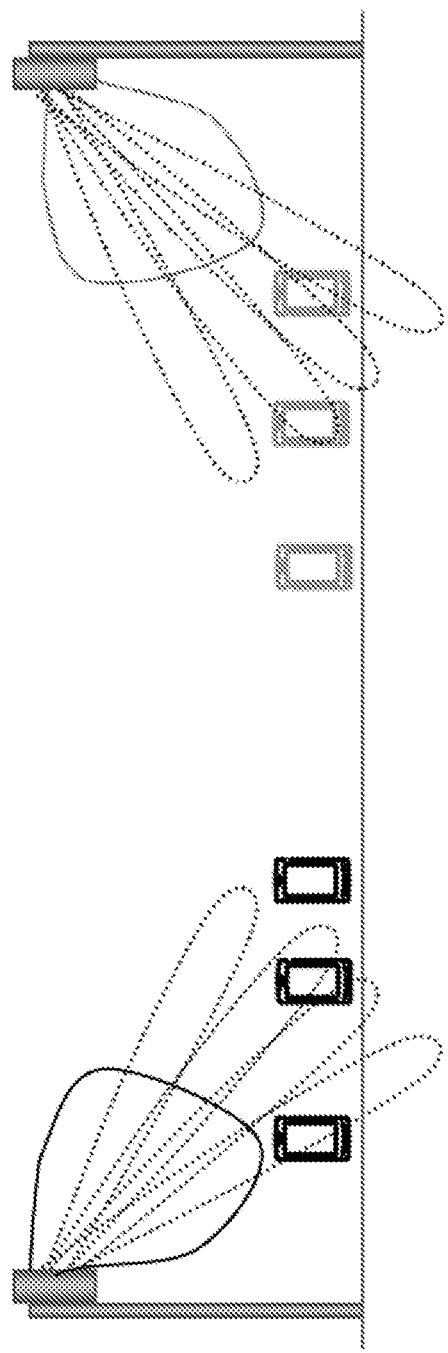
FIGS. 7 (a) and (b) show beamforming scenarios.
Figure 7B:
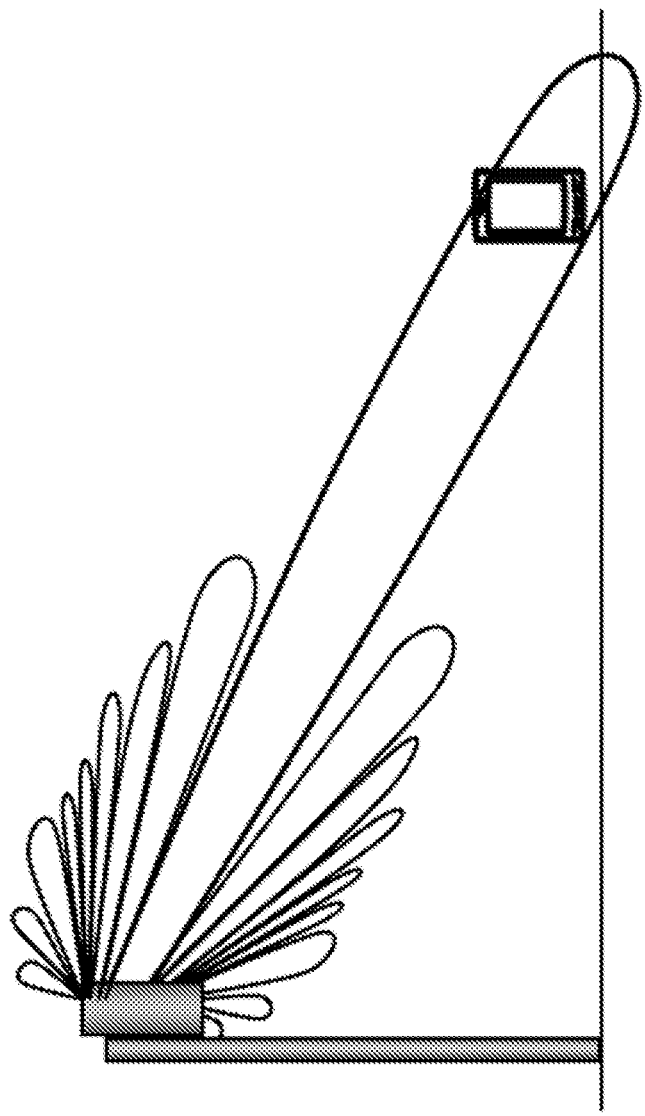

Cell selection for an elevation beamforming system is described as follows. In order for a UE to be served by an eNodeB it first needs to connect to the eNodeB in some way. This is typically done using some kind of control signaling such that a UE can compare different control signals, transmitted from different eNodeBs, and then attach to the eNodeB which corresponds to the strongest signal. This signal is typically beamformed and we will in this document refer to such a beamformed control signal as a cell selection beam. This is illustrated in FIG. 7 (*a*), two NodeBs, able to perform elevation beamforming when transmitting data, have one cell selection beam each (corresponding to the solid line). The different UEs will then attach to the eNodeB corresponding to the strongest cell selection beam. It is here pointed out that although we use the term cell in this document the meaning of this term is quite general; it may in general be placed with node, point, transmission point or transmission points etc.

Given that a UE has attached to a certain eNodeB it can then have data transmitted with one of the eNodeBs data transmission beams (corresponding to the dotted lines in the figure). We will in this document refer to such beams as data transmission beams. Furthermore, it is here pointed out that there may be many other signals also transmitted by the eNodeB; one such example is a cell selection beam for the purpose of serving legacy UEs which are not able to utilize UE specific elevation beamforming. In the same manner there may also exist other data channels.

Beamforming patterns are described as follows. In FIG. 6, the beamforming patterns for different beams are illustrated as rather ideal beam shapes. This ideal shape is however not possible to implement in practice; in a practical system it is inevitable to have sidelobes which is illustrated in FIG. 7 (*b*). These sidelobes are typically damaging for the system performance since they imply that energy is emitted in unwanted directions.

Figure 8:
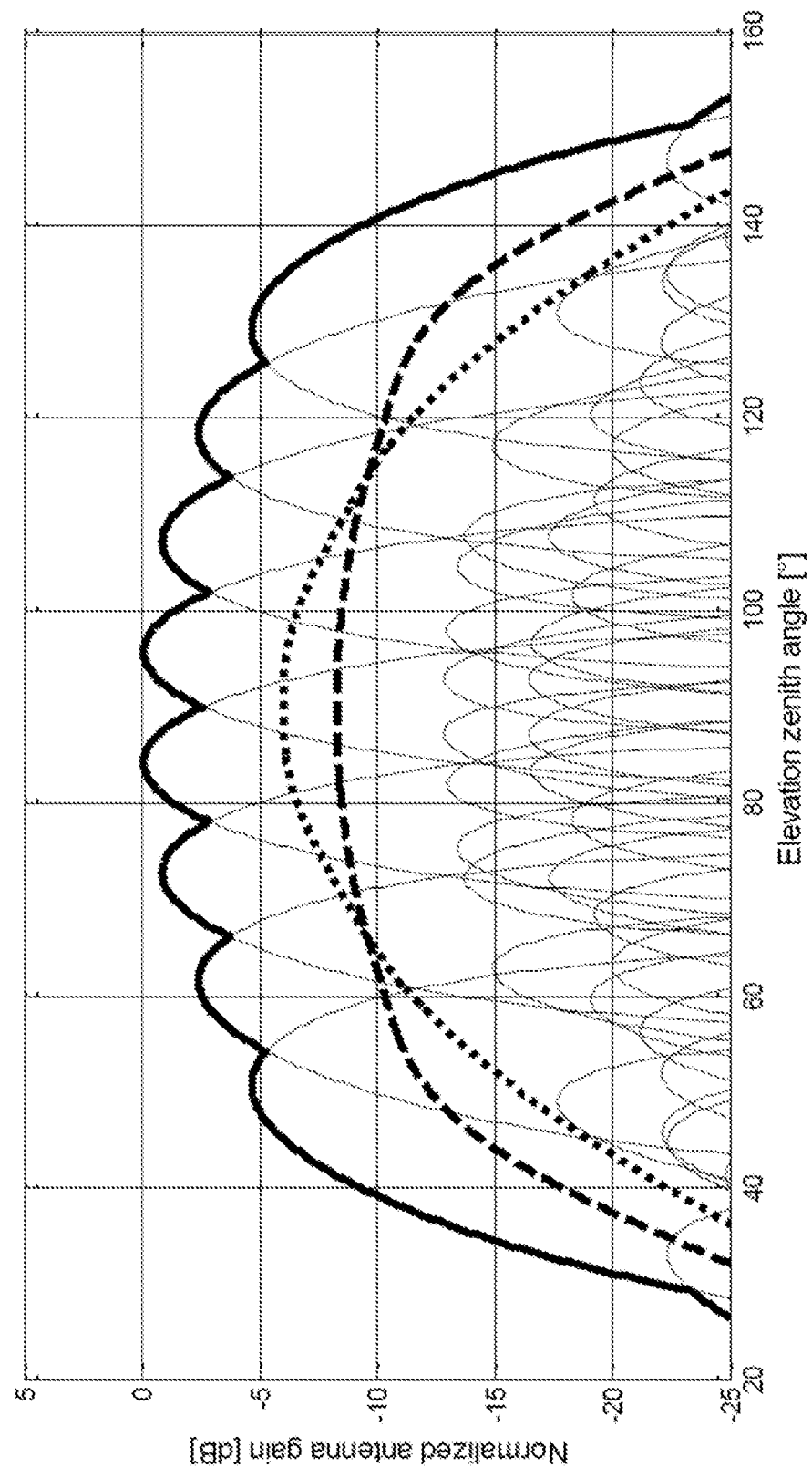
FIG. 8 shows examples of angular profiles for beamforming.

Angular power profiles are described as follows. Beamformed transmission of a given kind of signal from an eNodeB can be characterized using angular transmit-power profiles. Such profiles are useful when speaking of multiple beams for transmission, for example when multiple beams are simultaneously transmitted (but carrying uncorrelated signals), and/or when dynamically switching beams in time. Beamformed transmission may in general be constrained to only use beams, in particular a limited number of beams, which may be pre-defined, from a given finite or infinite set of beams. In FIG. 8 a set of 8 elevation beams is illustrated for example with solid lines). There may be defined two different angular transmit power profiles, e.g. by measuring transmitted power in different elevation angles over a certain observation interval in time and/or by analysis or simulation:

1. Angular maximum-power profile. The maximum transmit-power level observed for each angle.
2. Angular average-power profile. A time-averaged transmit-power level for each angle.

The maximum-power profile depends on the set of beams used, while the average-power profile also accounts for how frequently the beams are used and may be dependent on the usage location and/or geographic/architectonic/topographic position of user equipments. In FIG. 8, the maximum-power profile (thick solid line) is indicated as the max-contour over the set of beams. FIG. 8 also provides two examples of average-power profiles assuming different probability distributions for the set of beams (mainly dependent on use). The dashed line assumes equal-probability beams, while the dotted line assumes that the closer a beam is to the horizon (90° elevation zenith angle), the more likely it is to be used.

In order to compare different angular power profiles, a smoothing step may be performed: a smoothed power profile can be obtained using a sliding window that for each angle computes a weighted average of the power profile within an interval around the angle. Extreme cases that are not relevant when comparing different power profiles (e.g. if confined to very small angular intervals) can be effectively removed by smoothing. In the remainder of this disclosure, a smoothing step may have been included when referring to angular power profiles. Specifically, FIG. 8 shows a set of 8 elevation beams (narrow solid lines), the maximum-power profile (thick solid line), and two examples of average-power profiles (thick dashed and dotted lines).

The concept of a horizon is described as follows. In this document, the term "horizon" may be used. This is a general term which may refer to the true horizon which is the apparent line that separates earth from sky, the line that divides all visible directions into two categories: those that intersect the Earth's surface, and those that do not. It may also refer to, in the case that the true horizon is obscured by trees, buildings, mountains, etc., the so called visible horizon which is the resulting intersection of earth and sky when taking these obstacles into account. It may also furthermore refer to the celestial horizon indicating a zenith angle of 90 degrees.

Although dynamic elevation beamforming or beam selection (e.g., the selection of one of a beam of a set of beams provided by a transmitter arrangement like a eNodeB) may be a powerful tool for directing transmitted energy towards a receiving device like a UE of interest, thereby increasing the received signal level, there is also another aspect that needs to be taken into consideration to maximize system performance—interference.

Figure 9:
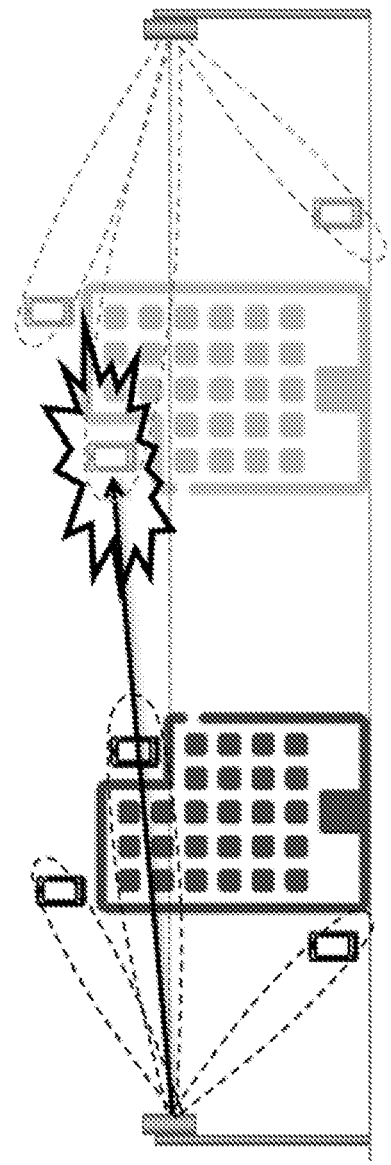
FIG. 9 shows an example of a beamforming scenario.

This is illustrated in FIG. 9: If the eNodeB directs its transmitted power towards a UE it may at the same time also direct the transmitted energy towards another UE currently receiving a signal from another eNodeB. Hence, transmitter arrangements like eNodeBs may cause interference to their neighboring cells when performing dynamic elevation beamforming and this interference may be very harmful for the system or its performance. In fact, it is possible that employing dynamic elevation beamforming in a communication system will not lead to a system-level gain, since the increase in received signal level by dynamic beam selection may be less than the simultaneous increase in the interference level, in particular if viewed over all device, in particular receiving devices or UEs.

A concept discussed in this disclosure is to exploit knowledge about expected caused interference to enhance the performance of a communication system employing dynamic elevation beamforming when transmitting data. By considering the propagation path directions to (the expected positions of) the interfered UEs, it is possible to form an elevation-angle interval—typically close to, or including, the horizon—where emitted power is likely to cause substantial interference to other UEs in the system (e.g., UEs outside of the present eNodeBs control). Individual UEs that would benefit from being served by an unrestricted beam pointing towards an angle within this interval may—in a system applying the disclosed concept—instead be served by a beam with substantially less transmit power in this direction.

Nevertheless, the communication system as a whole may benefit greatly from the reduced overall interference level. The design may in addition be carried out in such a manner that a sufficient power level will reach (the expected positions of) the UEs to be served at the same time as a low power level will reach (the expected positions of) the interfered UEs.

Alternatively or additionally, knowledge about expected caused interference may be exploited to enhance the performance of a communication system employing elevation beamforming when transmitting data. Emitted energy (transmitted power) within a certain elevation-angle interval, for instance around the horizon, tends to cause substantial interference to other UEs in the system (e.g., UEs outside of the present eNodeBs control).

This effect may be accommodated for by on purpose constraining dynamic UE specific elevation beamforming within this interval. This is done by determining the cell selection beam(s) in such a manner that the emitted power within this interval is low. This will imply that the eNodeB, to some extent, will avoid serving users within this elevation interval. Furthermore, the data transmission beam for dynamic UE specific elevation beamforming are also matched to the cell selection beam in the sense that in angle intervals where the cell selection beam emits low power also the data transmission beam, when used, will emit low power. This will in turn lead to that the data transmission beams, in directions which cause interference, are used to a limited extent and when they are used they will not cause a high level of interference. On the other hand, in intervals where the cell selection beam emits a higher level of power also the data transmission beam(s), when used, emits a higher level of power.

The concepts discussed herein may be implemented without any additional interaction between eNodeBs of different antenna sites and/or involvement of higher level network layers.

The performance for dynamic UE specific elevation beamforming may be improved by matching the angular maximum-power profile of the cell selection beam(s) with the angular maximum-power profile of the data transmission beams.

A concept of this disclosure is to exploit prior knowledge about expected caused interference to enhance the performance of a communication system employing elevation beamforming when transmitting data. Emitted energy within an elevation-angle interval—typically close to, or including, the horizon—may tend to cause substantial interference to other UEs in the system (e.g., UEs outside of the present eNodeBs control). In particular, the effect can be detrimental if the transmit power is focused into a beam within such an interval.

This point is illustrated in FIG. 9, where six UEs exist in the network, the three (left) black UEs are assumed to be served by the left eNodeB whereas the three (right) gray UEs are assumed to be served by the right eNodeB. As can be seen the left eNodeB will use dynamic elevation beamforming in order to serve its UEs. However, the beam close to the horizon will also cause substantial interference to one of the gray UEs. The approach or concept discussed herein recognizes that it may be beneficial to consider this effect by on purpose constraining the emission around the horizon.

Figure 10:
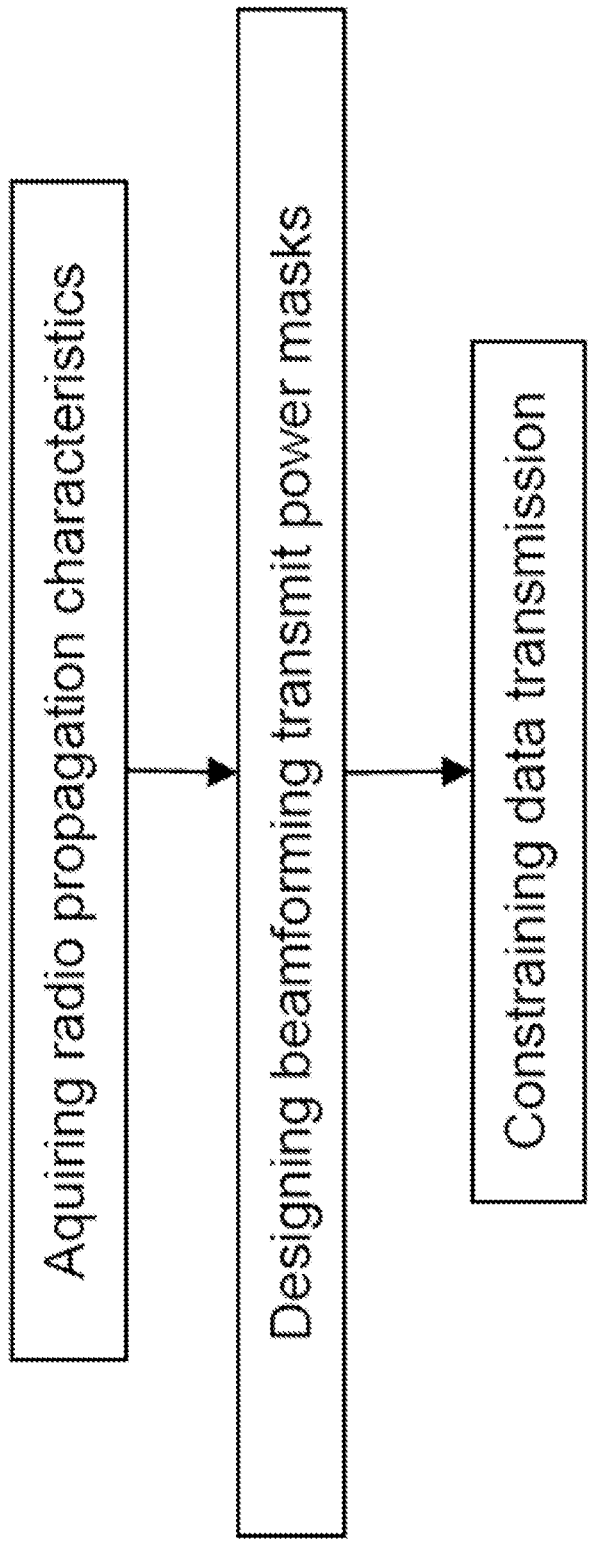
FIG. 10 shows an example of a method for beamforming.

Mitigating interference produced by dynamic elevation beamforming is described as follows. In this exemplary variant it is illustrated how an eNodeB, using dynamic UE-specific elevation beamforming can use the proposed method to minimize the interference caused to neighboring cells while ensuring a sufficient level of received power for its UEs of interest. FIG. 10 represents a flowchart of a method for constraining beamforming.

Aquiring radio propagation characteristics is described as follows, with reference to FIG. 10. In the first step of the flow chart knowledge regarding the radio propagation characteristics is obtained. Generally speaking, this knowledge can include both the directions in which radio waves to and from the served and interfered users are transmitted or received as well as the power carried by these waves. The knowledge may be obtained or derived from the geometry of the deployment and sites, or it may alternatively be measured directly or indirectly as part of system operation. An example of a variant where the knowledge of angular intervals to served and interfered users are derived from the site deployment is given in FIG. 11. Measurements may include radio channel measurements, e.g. on the reverse link, where angular spectra of the desired users' signals and of the interfered users' signals are derived. Either the angular interval or the angular spectrum may be used when designing beamforming masks.

Figure 11:
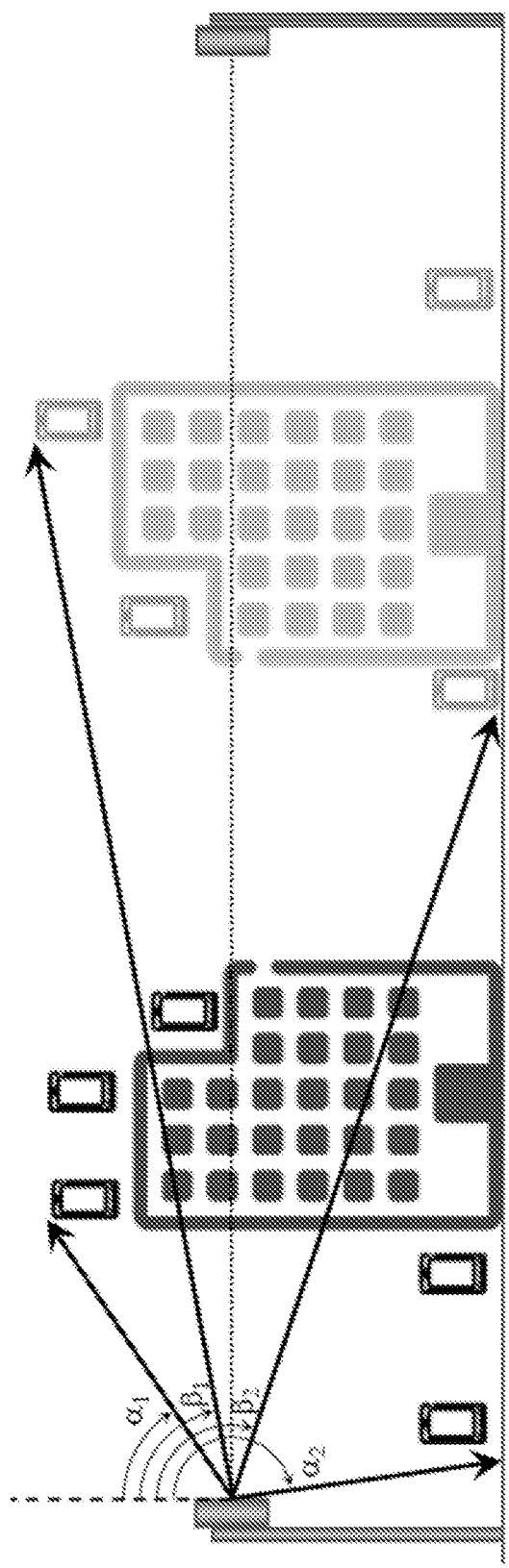
FIG. 11 shows another example of a beamforming scenario.

In one variant, an analysis—as illustrated in FIG. 11—is conducted for an eNodeB in a given deployment. In the figure it is assumed that the black UEs are served by the left eNodeB whereas the grey UEs are interfered by the same eNodeB. As illustrated in the figure there is typically a range of elevation angles around the horizon where the interfered UEs are located (i.e., beta1 to beta2; this may be considered a critical angular interval), and a range of angles where the served UEs are located (i.e., from alpha1 to alpha2; this may be considered as serviced angular interval), and the purpose of the analysis may be to estimate values of alpha1, alpha2, beta1, beta2 and/or the critical angular interval and the serviced angular interval. Hence, the conducted analysis will through the resulting angles provide information on 1) in which angles the eNodeB may emit energy to its served UEs without taking system interference into account; and 2) in which angles the created interference may be particularly harmful and the system may therefore benefit from constraining elevation beams. This analysis may be seen as a locational and/or deployment analysis, which generally may include analysis of topography and/or geography and/or architecture and/or likely/available positions and/or traffic (e.g. pedestrian and/or vehicular traffic or pathways) for UEs within the transmitting/serving range of the transmitter arrangement/eNodeB.

Although the example in FIG. 11 illustrates the propagation paths between the eNodeB and the UEs by straight arrows—as if there were a line-of-sight to all UEs—this does not necessarily have to be the case. Consider for instance the cases with no-line-of-sight propagations as well as outdoor to indoor propagations. In such cases the angles alpha1, alpha2, beta1 and beta2 may be affected.

Finally it is pointed out that the analysis may be conducted without the knowledge of the actual UE positions; the analysis may instead be carried out based on prior knowledge about the expected UE positions. Hence, in this way the analysis may be done beforehand and then exploited in an offline (possible long term) design of the beamforming masks. The analysis may be based on simulation and/or mathematical modelling and/or experimental data, in particular on-site measurements of the (elevation) angular characteristics.

FIG. 11 specifically shows an interval of served UEs (alpha1 to alpha2) and a critical angular interval of interfered UEs (beta1 to beta2).

Other variants on obtaining radio propagation characteristics are described as follows. There are multiple ways to conduct the previously mentioned analysis in order to obtain the angles alpha1, alpha2, beta1, beta2, which may be performed individually and/or in any combination:

These angles and/or intervals may be estimated and/or determined through manual measurement at the given eNodeB.

The angles and/or intervals may be estimated and/or determined through automatic measurement carried out by the system.

The angles and/or intervals may be estimated through an analytical analysis of the given deployment. In one such variant the geographical positions of the eNodeB or transmitter arrangement and possible UE positions and buildings may be known and analyzed in order to estimate the current propagation characteristics.

A given transmitter arrangement or eNodeB may transmit beamformed reference signals at certain angles with the intention of probing the interference caused when transmitting in the direction of said angles (this interference may e.g. be detected by suitable receivers positioned/moved to measure the interference over an angle). For example, the transmitting or given eNodeB may then coordinate with its neighbor eNodeBs to instruct the UEs connected to said neighbor eNodeBs to report back CSI feedback on the transmitted reference signals. Based on said CSI feedback, the angles may be estimated by the given eNodeB.

Designing beamforming masks is described as follows. Constrained data transmission from an eNodeB can be realized using an upper beamforming mask, which is an upper bound (possibly angular-dependent) on the transmit power that must not be violated by any beam used for dynamic elevation beamforming. Hence, it is an upper bound on the angular maximum-power profile for data transmission. It is of primary interest to define an upper beamforming mask on the interval—typically close to, or including, the horizon—where interfered UEs are located (e.g., from beta1 to beta2) in order to obtain a system-level benefit of reduced interference. The level of the upper beamforming mask, as well as its variable shape over elevation angles, in particular covering the critical angular interval from beta1 to beta2 may be a design parameter that is set a priori, or it may be based on actual measurements in the live system such as load or interference level measurements. The mask may be adapted for covering/defining a power profile for at least the critical angular interval and/or the serviced angular interval.

Optionally, a lower beamforming mask may be designed on the interval of served UEs (e.g., from alpha 1 to alpha2). The purpose of introducing such a mask may be to ensure that the actions taken to comply with the upper beamforming mask do not compromise the performance of served UEs to an undesired extent. The lower beamforming mask may in general be an angular-dependent lower bound on the transmit power, which may be interpreted in the following way: For each angle where it is defined, the eNodeB can construct a data transmission beam that 1) exceeds the transmit-power bound of the lower mask with either a mainlobe or one of its sidelobes; and 2) does not violate the upper beamforming mask. In other words, the lower beamforming mask is a lower bound on the angular maximum-power profile for data transmission.

Introducing a lower beamforming mask reflects the general case that the interval of interfered UEs and the interval of served UEs may be overlapping. Hence, mitigating interference may come at the expense of served UEs receiving substantially less power from its serving eNodeB. The two beamforming masks may reflect the two conflicting interests on the angular interval containing both served and interfered UEs: 1) emitting sufficient power to serve a UE (motivating a lower beamforming mask); and 2) constraining emitted power to reduce interference (motivating an upper beamforming mask). By properly selecting both an upper and a lower beamforming mask (which may refer to maximum and minimum power distributions, respectively), a suitable trade-off between the conflicting interests can be achieved, leading to enhanced system-level performance.

Other variants on designing beamforming masks are described as follows. There are multiple ways to conduct the previously mentioned method or analysis in order to design beamforming masks:

Typically the interference is of less importance in a low load scenario than in a high load scenario. Therefore, in one variant the masks are load dependent enabling a load dependent suppression of the caused interference by adjusting the masks.

In one variant the masks are continuously updated based on system information such as time of the day, resource utilization, etc.

Constraining data transmission is described as follows. There are presented several variants that assume that there are UEs to be served in an angular interval, e.g. between alpha1=40° and alpha2=140°, and interfered UEs in a second (angular) interval, e.g. between beta1=80° and beta2=100°. The UE may apply implicit CSI feedback by conveying beam recommendations from an unrestricted codebook, illustrated in FIG. 12, comprised of 8 beams in the angular interval of served UEs.

Figure 12:
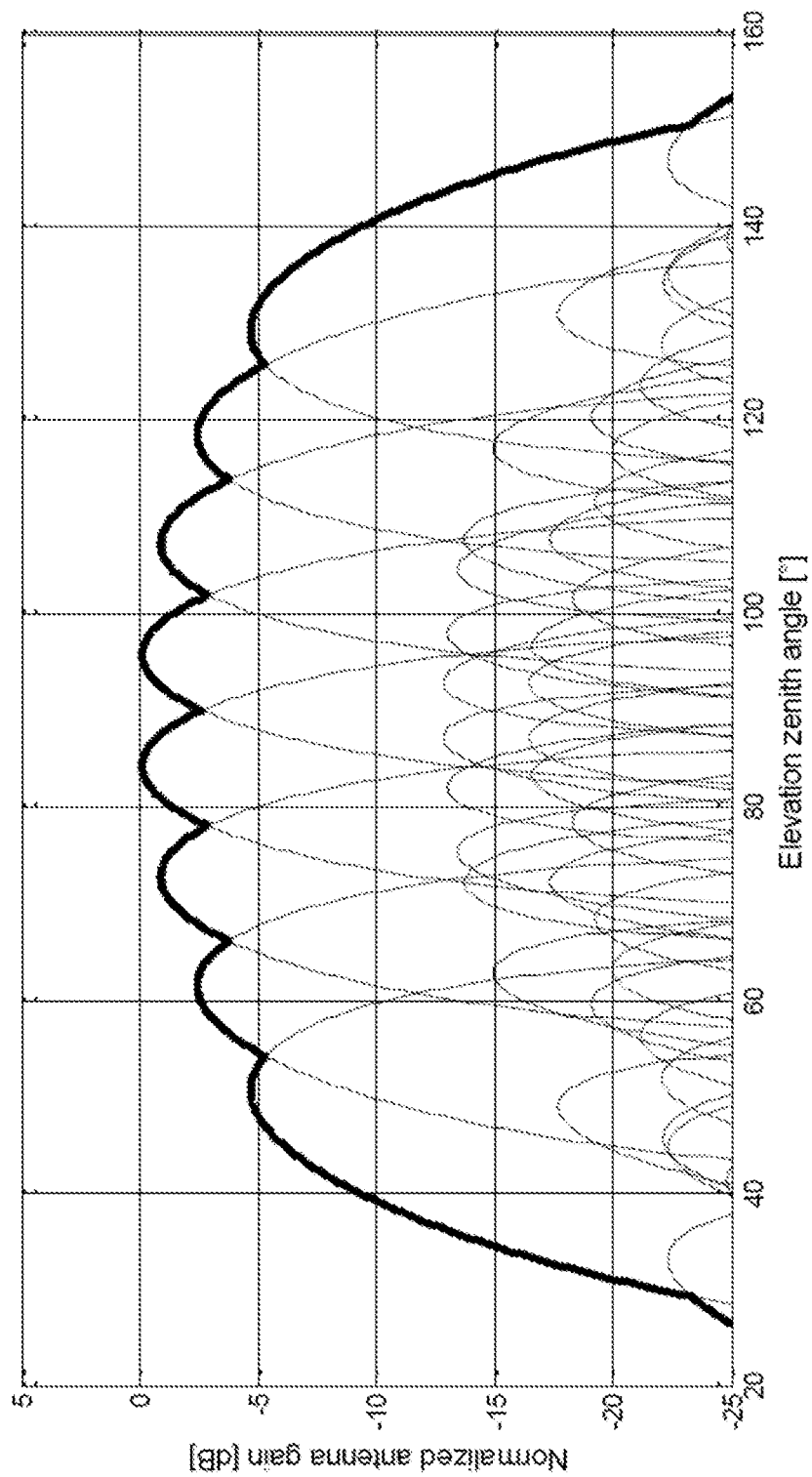
FIG. 12 shows an angular profile.

FIG. 12 shows a unrestricted (without a predefined mask) set of 8 beams spanning the desired angular interval between alpha1=40° and alpha2=140°.

Figure 13:
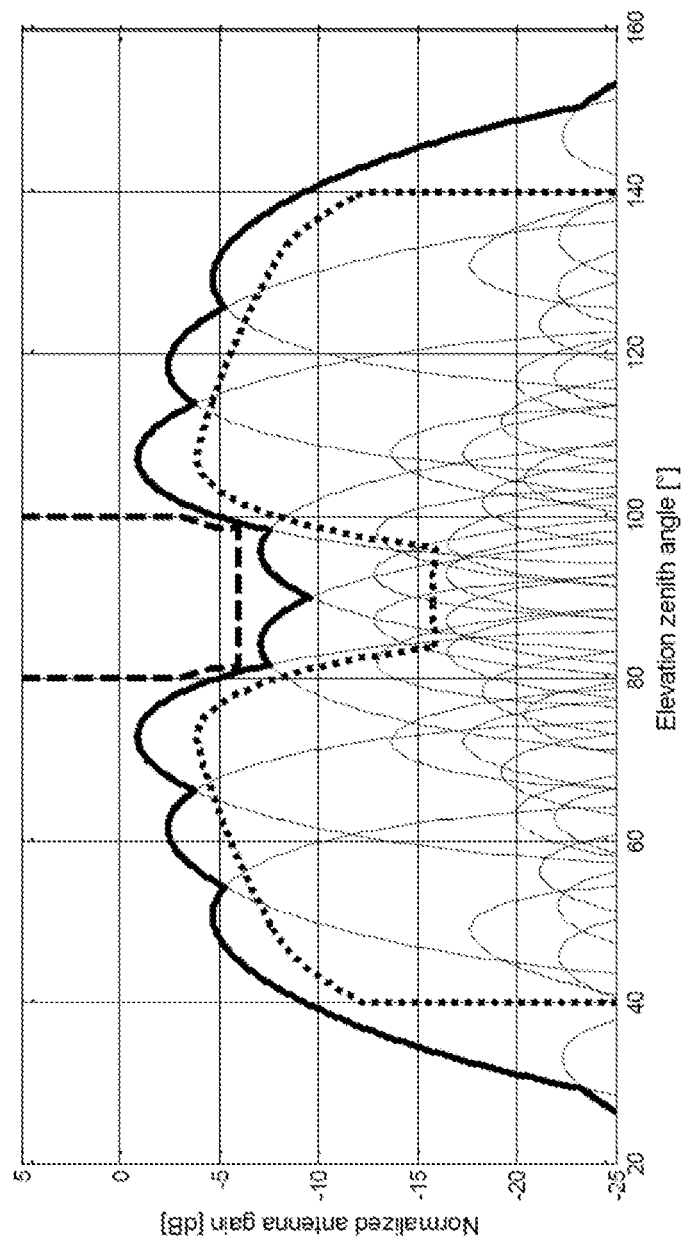
FIG. 13 shows an angular profile with a gap.

FIG. 13 shows a constrained set of beams, the set being constrained by power scaling of two beams. The set may correspond to a codebook, which may be considered a restricted codebook due to the constraint.

All beams in the codebook may not be appropriate to use for data transmission, e.g. if emitted power in a critical angular interval, e.g. the interval between beta1=80° and beta2=100°, causes substantial system-wide interference. An upper beamforming mask is illustrated by the dashed curve in FIG. 13. This mask is in conflict with the two beams closest to the horizon (at 90°) for the unrestricted codebook in FIG. 12. This may be dealt with by means of reducing the transmission power when using one of these two beams for data transmission. FIG. 13 also displays the actual set of beams used for data transmission, including a −7 dB offset for the two beams located around 84° and 96°, respectively, thereby forming a gap around the horizon. The constrained set of beams in FIG. 13 is easily seen to comply with the upper beamforming mask (dashed line) by observing that the angular maximum-power profile (thick solid line) lies below the upper mask. Moreover, the power scaling of beams does not violate the lower beamforming mask (dotted curve), since the power profile lies above the lower mask.

In another variant, where the UE recommends the use of a beam which violates the upper beamforming mask, the eNodeB may decide not to follow the UE's recommendation. Instead, it may choose another beam which fulfills the upper beamforming mask constraint. This beam may furthermore have a side lobe with a similar pointing direction as the main lobe of the recommended beam. This variant effectively alters the angular maximum-power profile to lie below the upper beamforming mask.

Figure 14:
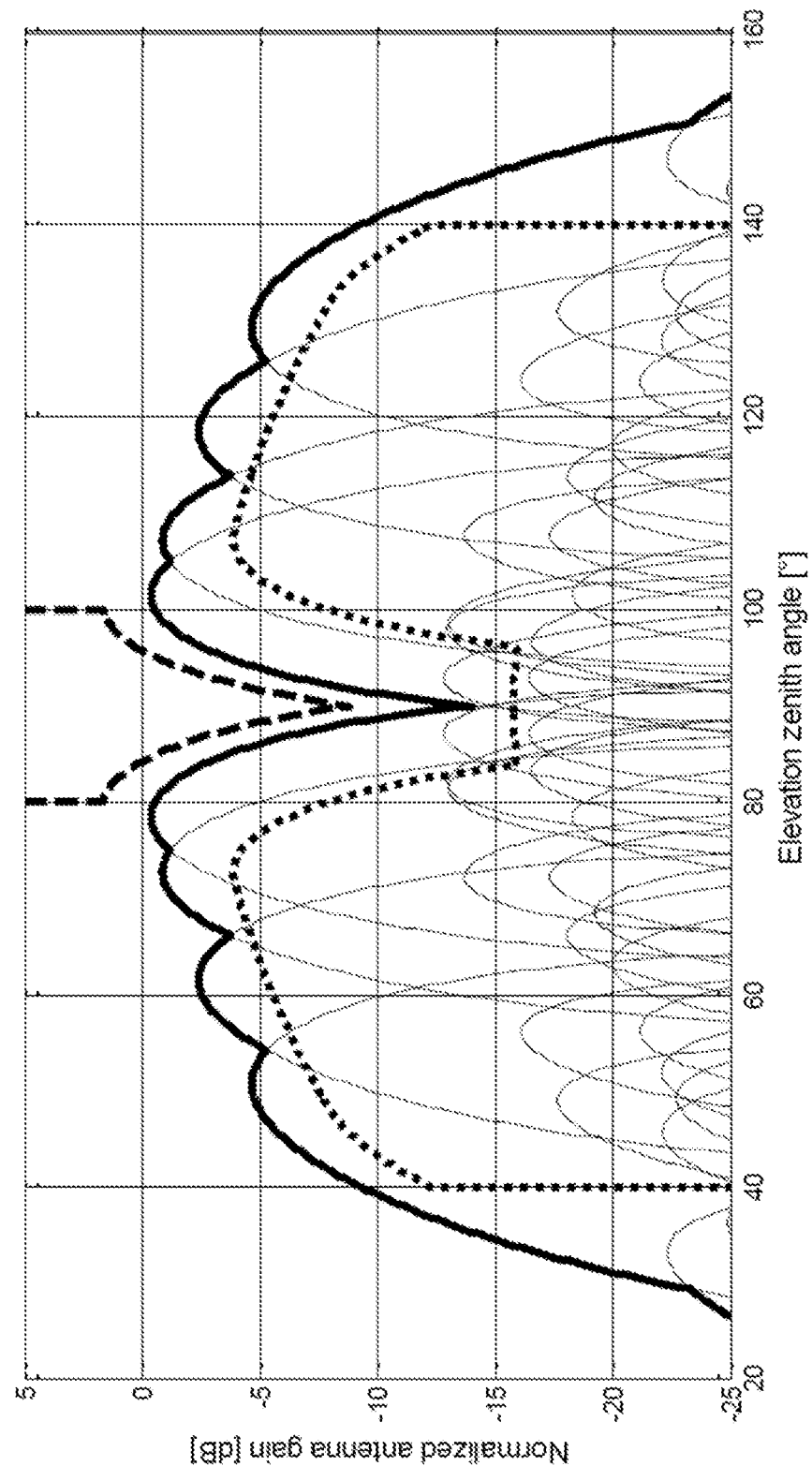
FIG. 14 shows another angular profile with a gap.

FIG. 14 shows a constrained set of beams, the set being constrained by moving two beams.

In another variant the beam recommended (which may mean selected, e.g. based on a cell selection beam and/or selected from a set of beams provided) by the UE may only violate the upper beamforming mask constraint to a rather limited extent; only a small part of the beamforming mask interval is violated. The eNodeB may then be able to meet the beamforming mask constraint by directing the recommended beam in a slightly different angle in such a manner that the upper beamforming mask constraint is fulfilled. This is exemplified in FIG. 14, where compliance with the beamforming mask is ensured by moving the two beams at 84° and 96° to 78° and 102°, respectively.

Figure 15:
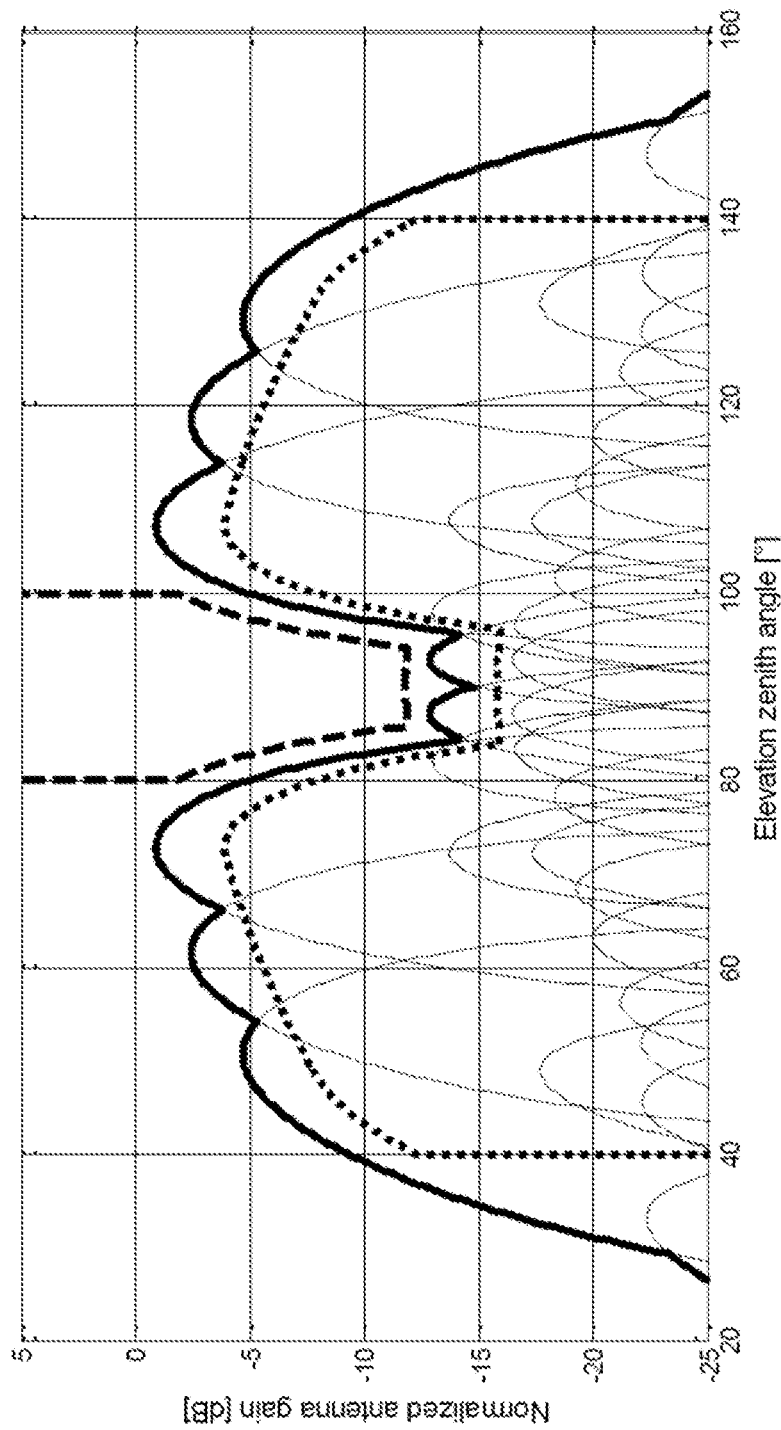
FIG. 15 shows yet another angular profile with a gap.

FIG. 15 shows a constrained set of beams, the set being constrained by omitting two beams (from set/the codebook).

The UE selecting a beam may or may not be aware of the actions taken by the eNodeB to ensure compliance with the upper beamforming mask. The UE may for instance be unaware of these actions unless the constrained set of data transmission beams are also used to transmit probing signals for CSI feedback.

Generally, the transmitter arrangement may control beamforming and/or determine a maximum power level mask independent of the user equipment.

The variants can be extended to cover any kind of CSI feedback from the UE, or even CSI directly estimated at the transmitting eNodeB, e.g. via uplink transmission on a reverse link. Such CSI may include one or more elevation angles for instance. Irrespective of the kind of CSI and how it is obtained, and irrespective of the method used for constructing a beam based on CSI, the previously mentioned variants can be applied on constructed beams that are in conflict with the upper beamforming mask.

Another variant is presented in FIG. 15, initially assuming implicit CSI feedback. This variant uses codebook subset restriction in the sense that only a subset of the beams in the unrestricted codebook (see FIG. 12) can be selected by the UE (the eNodeB signals the UE which beams the UE is allowed to selected from). Here, the two beams around 84° and 96° have been omitted from the codebook, and the remaining beams outside of the codebook gap are not conflicting with the upper beamforming mask. The power emitted below the mask is caused by sidelobes from the remaining beams.

Generally, use of antenna port virtualization may be implemented, e.g. in a method or transmitter arrangement, e.g. to ensure compliance with an upper beamforming mask or maximum power distribution. Antenna port virtualization may comprise a transformation and/or mapping, in particular a UE-transparent transformation and/or mapping, connecting physical antenna-subelement ports and virtual antenna ports. It may be considered that antenna port virtualization includes mapping and/or maps one or more than one, e.g. a group of, physical antenna subelements or individual or separate antenna elements and/or corresponding ports to one or more virtual antenna elements. With antenna port virtualization, a signal, e.g. a transmission or transmission signal, which may be called feed signal, fed to a virtual antenna port may be mapped, in particular linearly mapped, onto one or more physical antenna subelements or antenna elements using complex virtualization weights (which may represent phase shift and/or amplitude scaling of the signal).

In an exemplary variant, there may be considered a vertical antenna array with N equispaced (single or dual polarized) subelements, which may be seen a separate or separately controllable antenna elements. The subelements partitioned into groups, e.g. disjoint or separate groups with no common members between groups, of M subelements (e.g., for each polarization), wherein the M subelements may be adjacent subelements. M may be equal for each group. Virtual antenna ports may be created and/or defined or mapped using a set of M virtualization weights (which may be a single set) applied on each group of subelements (wherein each weight may be applied and/or associated to one of the elements or subelements in the group). When M is a multiple of 2 (and N is a multiple of M), setting half of the virtualization weights to 1 and half to −1 (=180° phase shift) is sufficient to ensure that the virtual antenna ports cannot radiate power towards the horizon (assuming no mechanical tilt of the antenna leading to a shift from the horizontal). Hence, applying UE-specific beamforming on vertical virtual antenna ports designed in this manner will create a set of elevation beams with an angular maximum-power profile having the shape of a gap around the horizon. This variant readily extends to 2D antenna arrays, and a variety of horizontal and/or vertical virtualizations.

The virtualization weights may be further determined and/or tailored to comply with a certain upper beamforming mask, for example deciding which of the N/2 virtualization weight that have the 180° phase shift, or different amplitude or phase taperings. A mechanical tilt can also be accounted for by slightly modifying the virtualization weights. Additionally or optionally, antenna subelement spacing may be a design parameter that can be used to further shape the angular power profile to comply with both upper and lower beamforming masks. For example, making the distance between two antenna subelements significantly larger than half a wavelength can be used to create multiple "peaks" (not necessarily of equal strength) in the angular power profile (for example two peaks, one downwards and one upwards).

The use of virtualized antenna ports in shall not be regarded as limiting in any sense. The described "virtual antennas" may or may not be used in practice, e.g., for acquiring CSI feedback. If reference signals are transmitted without virtualization (i.e. using antenna subelements directly), the gap-shaping virtualization may nevertheless be used to form the beams, but then no longer in a UE-transparent manner.

In one variant the beamforming masks may be load dependent. With fewer users in the system, for instance, the best tradeoff between reducing interference in the interval beta1 to beta2 degrees and providing signal power to served UEs in the same interval may be more in favor to the latter. For example, the three pairs of beamforming masks illustrated in FIGS. 13, 14 and 15, may apply to the very same eNodeB at different loads, and hence also at different times.

Figure 16:
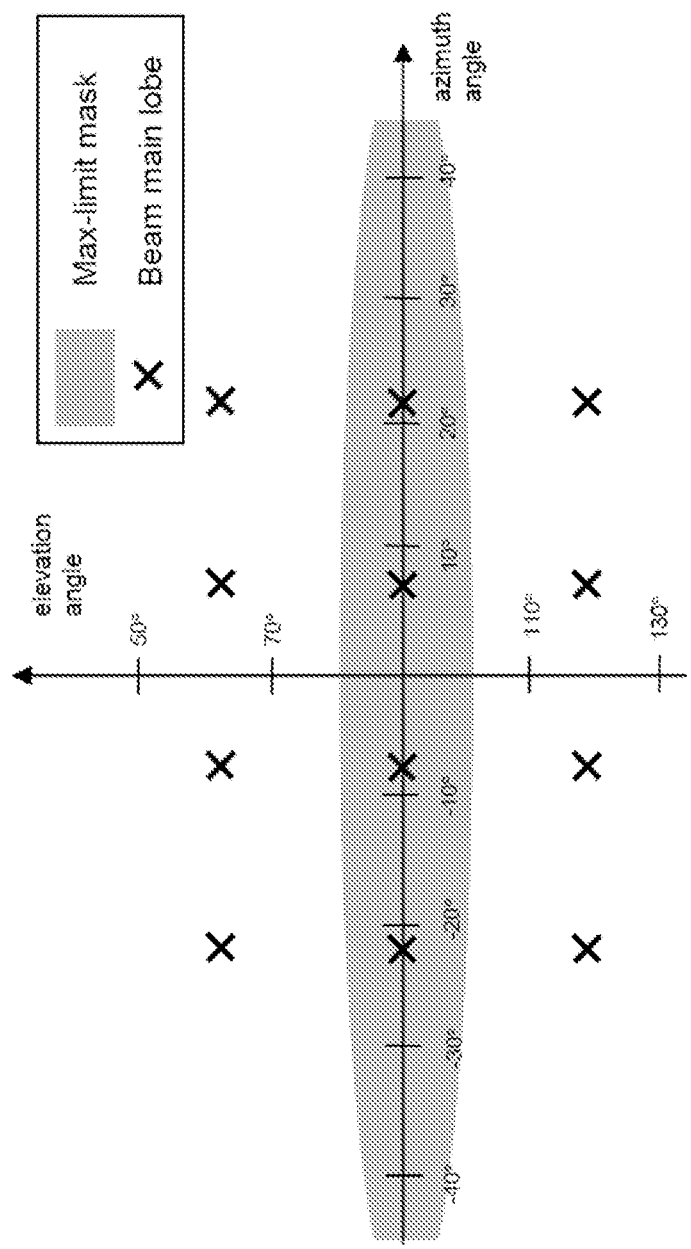
FIG. 16 shows an arrangement of a set of 12 beams.

Mitigating interference produced by dynamic joint elevation-azimuth beamforming is describes as follows with reference to FIG. 16. FIG. 16 shows a set of 12 beams in the joint elevation-azimuth angular domain and an elevation beamforming mask. In another variant the analysis is carried out jointly for the elevation and azimuth domain. FIG. 16 shows an example of how the physical propagation characteristics at a particular antenna position may translate into a beamforming mask. Note that the previously mentioned angles alpha1, alpha2, beta1, beta2 may depend on the azimuth angle, which can create a wide variation of 2D shapes. A set of beams available for data transmission are also indicated in FIG. 16. The previously exemplified methods for dealing with beams conflicting with one-dimensional masks naturally extend to 2D beams and 2D beamforming masks.

Figure 17:
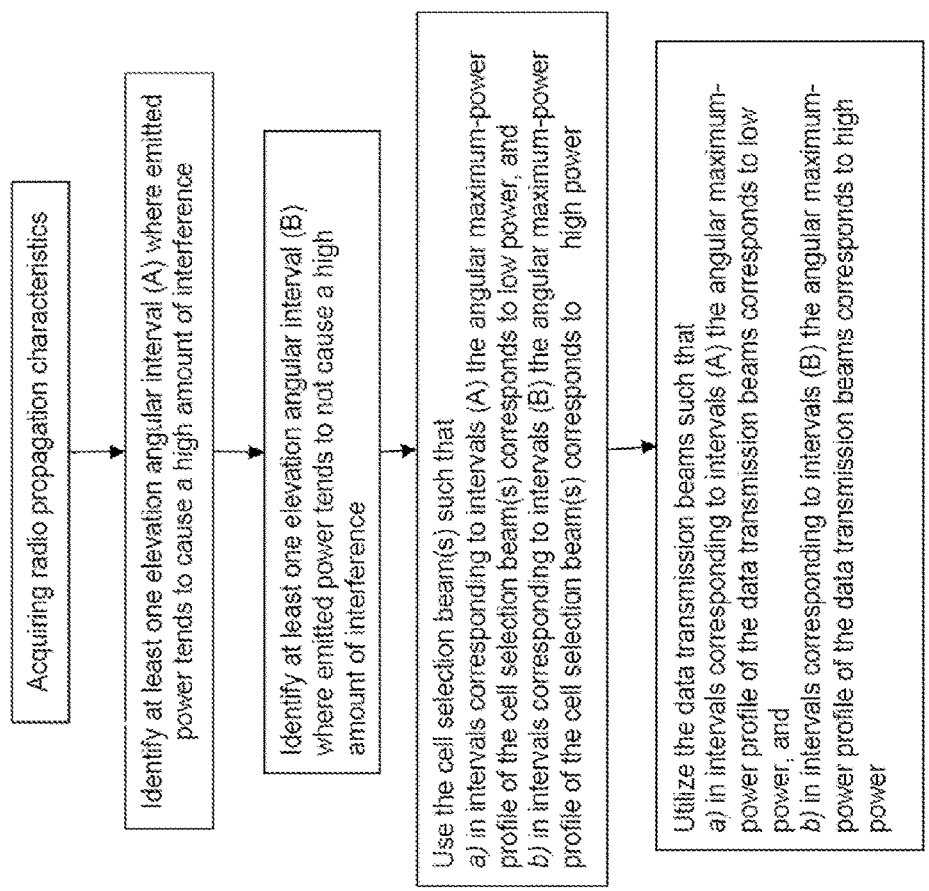
FIG. 17 shows a flowchart for beamforming.

Mitigating interference produced by dynamic elevation beamforming is described as follows. In this exemplary variant it is illustrated how an eNodeB, dynamically using elevation beamforming, may use the proposed method to minimize the interference caused to neighboring cells while ensuring a sufficient level of received power for its UEs of interest. A flow chart of an example for such an approach is illustrated in FIG. 17.

Acquiring radio propagation characteristics is described as follows with reference to FIG. 17. In the first step of the flow chart knowledge regarding the radio propagation characteristics is acquired. Generally speaking, this knowledge can include both the directions in which radio waves to and from the served and interfered users are transmitted or received as well as the power carried by these waves. The knowledge may be obtained or derived from the geometry of the deployment and sites, or it may alternatively be measured directly or indirectly as part of system operation. An example of a variant where the knowledge of angular intervals to served and interfered users are derived from the site deployment is given in the following. Measurements may include radio channel measurements, e.g. on the reverse link, where angular spectra of the desired users signals and of the interfered users signals are derived. This manner of acquiring of knowledge may be seen as deployment analysis.

Figure 18:
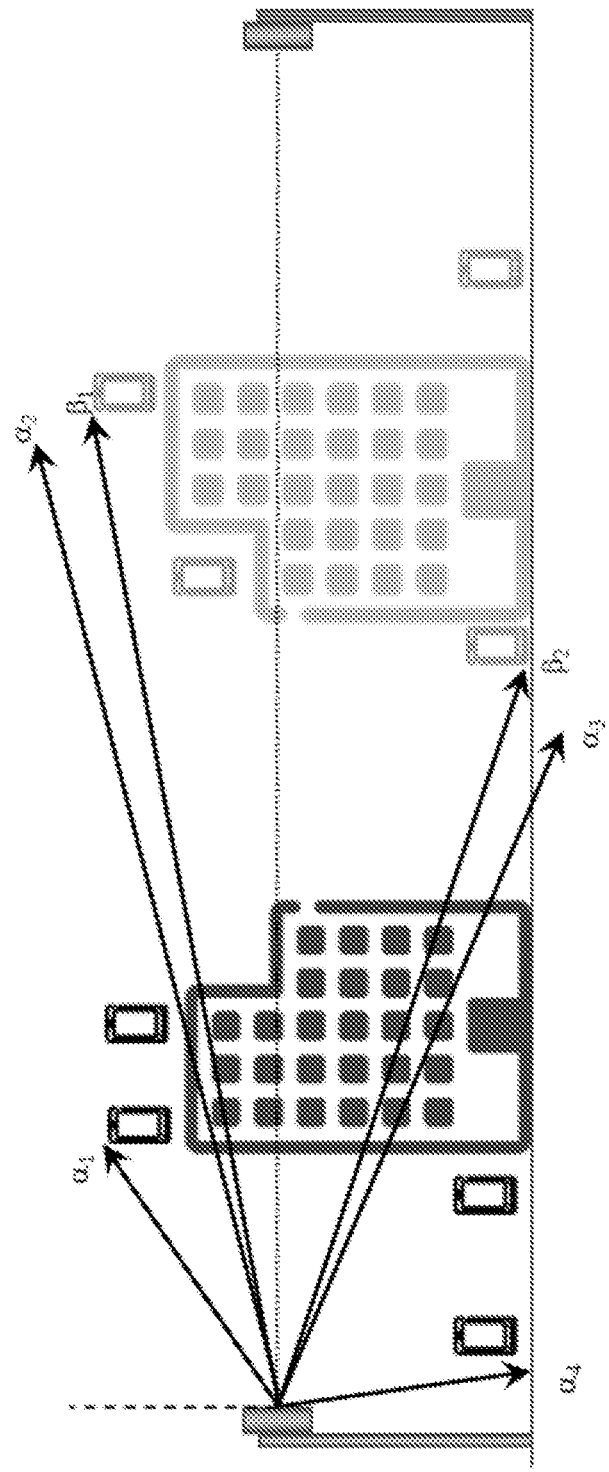
FIG. 18 shows yet another example of a beamforming scenario.

Identifying intervals (A) and intervals (B) is described as follows. In one variant an analysis as illustrated in FIG. 18 is conducted for an eNodeB in a given deployment. It is in the figure assumed that the black UEs are typically served by the left eNodeB whereas the grey UEs are typically served by the right eNodeB. Hence, the gray UEs will also be interfered by the left eNodeB. Furthermore, in the figure a set of vectors are illustrated. Each of these vectors have zenith angle which is illustrated in connection to each vector, hence alpha1, alpha2, alpha3, alpha3, alpha4 and beta1 and beta2. As illustrated in FIG. 18, there is typically a range of elevation angles around the horizon where the interfered UEs are located, i.e. beta1 to beta2, and a range of angles where the served UEs are located, i.e. from alpha1 to alpha4, and the purpose of the analysis is to estimate values of alpha1, alpha2, alpha3, alpha3, alpha4 and beta1 and beta2.

The conducted (deployment) analysis will through the resulting angles provide information on 1) in which intervals the eNodeB can emit energy to its served UEs without introducing (significant) system interference (corresponding to interval of type interval (A)) and 2) in which angles the created interference may be particularly harmful and the system may therefore benefit from constraining elevation beams (corresponding to interval of type interval (B), which may be considered a critical angular interval). Hence, in this variant it is concluded that the interval from beta1 to beta2 is of type interval (B).
the interval from alpha1 to alpha2 is of type interval (A).
the interval from alpha3 to alpha4 is of type interval (A).

Although the example in FIG. 18 illustrates the propagation paths between the eNodeB and the UEs by straight arrows—as if there were a line-of-sight to all UEs—this does not necessarily have to be the case. Consider for instance the cases with no-line-of-sight propagations as well as outdoor to indoor propagations. In such cases the angles alpha1, alpha2, alpha3, alpha3, alpha4 and beta1 and beta2 may be affected.

In another situation there may be no users in the interval from alpha1 to alpha2, which would result in only two intervals: the interval from beta1 to beta 2 of type interval (B) and the interval from alpha3 to alpha4 of type interval (A).

Finally it is pointed out that the analysis may be conducted without the knowledge of the actual UE positions; the analysis may instead be carried out based on prior knowledge about the expected and/or possible and/or likely UE positions, which may be considered in a deployment analysis. Hence, in this way the analysis may be done beforehand and then exploited in an offline (possible long term) design of the said intervals.

A possible consequence of this is that the angular intervals and/or their associated power level (for a mask) may not necessarily depend on actual UE positions;

However, the controlling of beamforming may generally depend on the angular position of a target receiving device, which may determine the part of a mask to be used.

Figure 19:
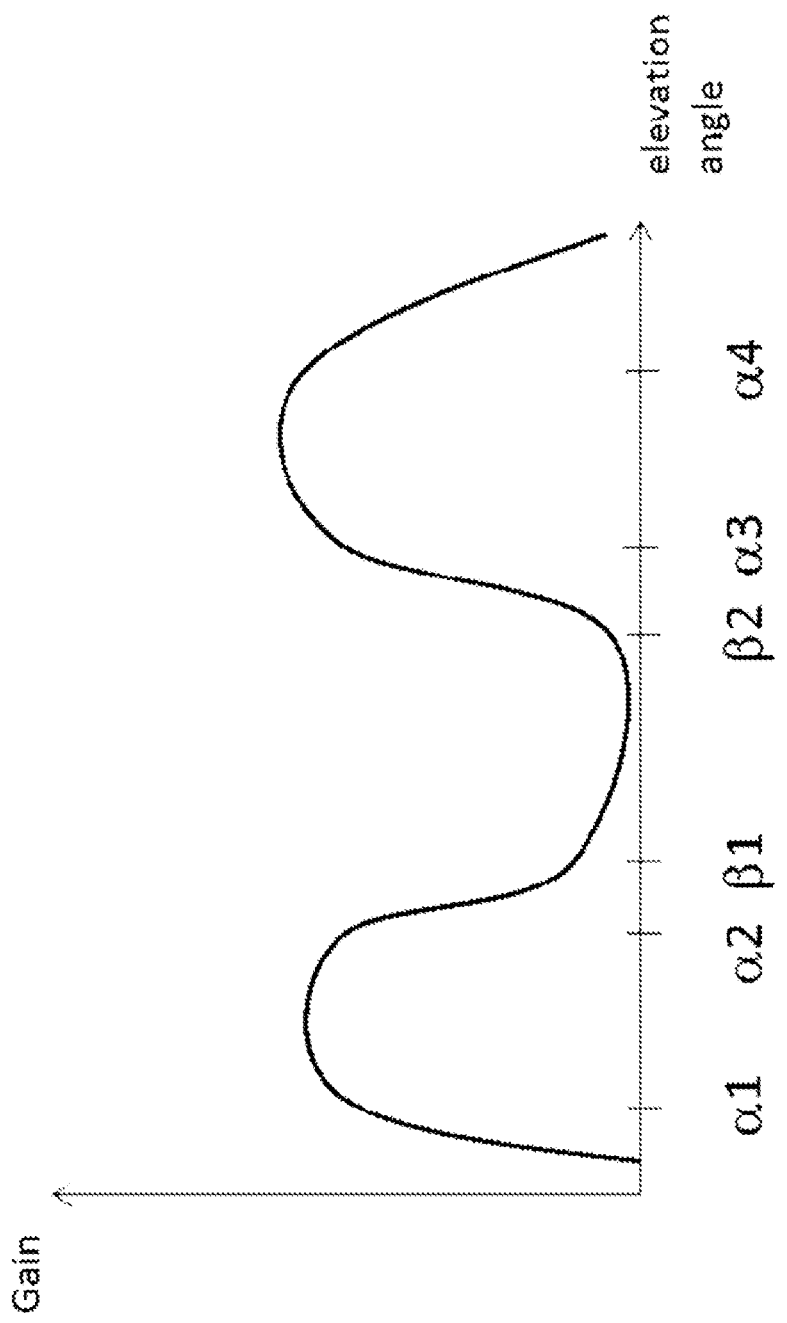
FIG. 19 shows an angular profile.

FIG. 19 shows the intervals of served UEs (serviced angular interval) and interval of interfered UEs (critical angular interval) for one possible situation.

Other variants on obtaining radio propagation characteristics

There are multiple ways to conduct the previously mentioned analysis in order to obtain the angles alpha1, alpha2, alpha3, alpha3, alpha4 and beta1 and beta2 and/or the critical angular interval and/or a serviced angular interval.

Generally, a deployment analysis as described above may be performed, which may include:

Estimating/determining the angles/intervals through a manual measurement at the given eNodeB;

Estimating/determining the angles/intervals through an automatic measurement carried out by the system.

Estimating/determining the angles/intervals through a geometrical analysis of the given deployment. In one such variant the geographical positions of the eNodeBs, UEs and buildings and the topography are known and analyzed in order to estimate the current propagation characteristics.

Alternatively or additionally, a given eNodeB may transmit beamformed reference signals at certain angles with the intention of probing the interference caused when transmitting in the direction of said angles. The given eNodeB may then coordinate with its neighbor eNodeBs to instruct the UEs connected to said neighbor eNodeBs to report back CSI feedback on the transmitted reference signals. Based on said CSI feedback, the angles can be estimated by the given eNodeB.

Designing cell selection beam is described as follows. Given the three previously identified intervals the cell selection beam should be designed in order to emit a low amount of energy in the interval from beta1 to beta2 and a high amount of energy in the interval from alpha1 to alpha2 as well as in the interval from alpha3 to alpha4. In one variant this will result in a beamforming pattern as presented in the FIG. 19. This pattern clearly fulfils the specified design objectives presented in the flow chart of FIG. 17.

In general it is a non-trivial task to design beamforming pattern of arbitrary shape. In one variant multiple cell selection beams are therefore used in the cell selection process. Hence, a UE will be able to measure multiple cell selection beams from an eNodeB and given that one of them corresponds to the strongest cell selection beam in the network it will attach to this eNodeB. In the above variant one could for instance use two cell selection beams where one is designed for emitting power in the interval from alpha1 to alpha2 and the other beam is designed to emit power in the interval alpha3 to alpha4. Each cell selection beam may for example correspond to one beamformed non-zero power CSI-RS configuration in the LTE standard. The used CSI-RS configurations may or may not be part of the new discovery signal (DRS).

Utilizing the data transmission beams is described as follows. In one variant the eNodeB is able to transmit data using UE specific elevation beamforming based on a set of beamformers originating from a codebook. Hence, the eNodeB needs to select one out of a finite possible set of available beams and does this based on a recommendation from the UE on selected precoder. Such a codebook is illustrated in FIG. 20 (here the sidelobes are omitted, to only illustrate the different mainlobes corresponding to the different beams produced by the codebook).

Figure 21:
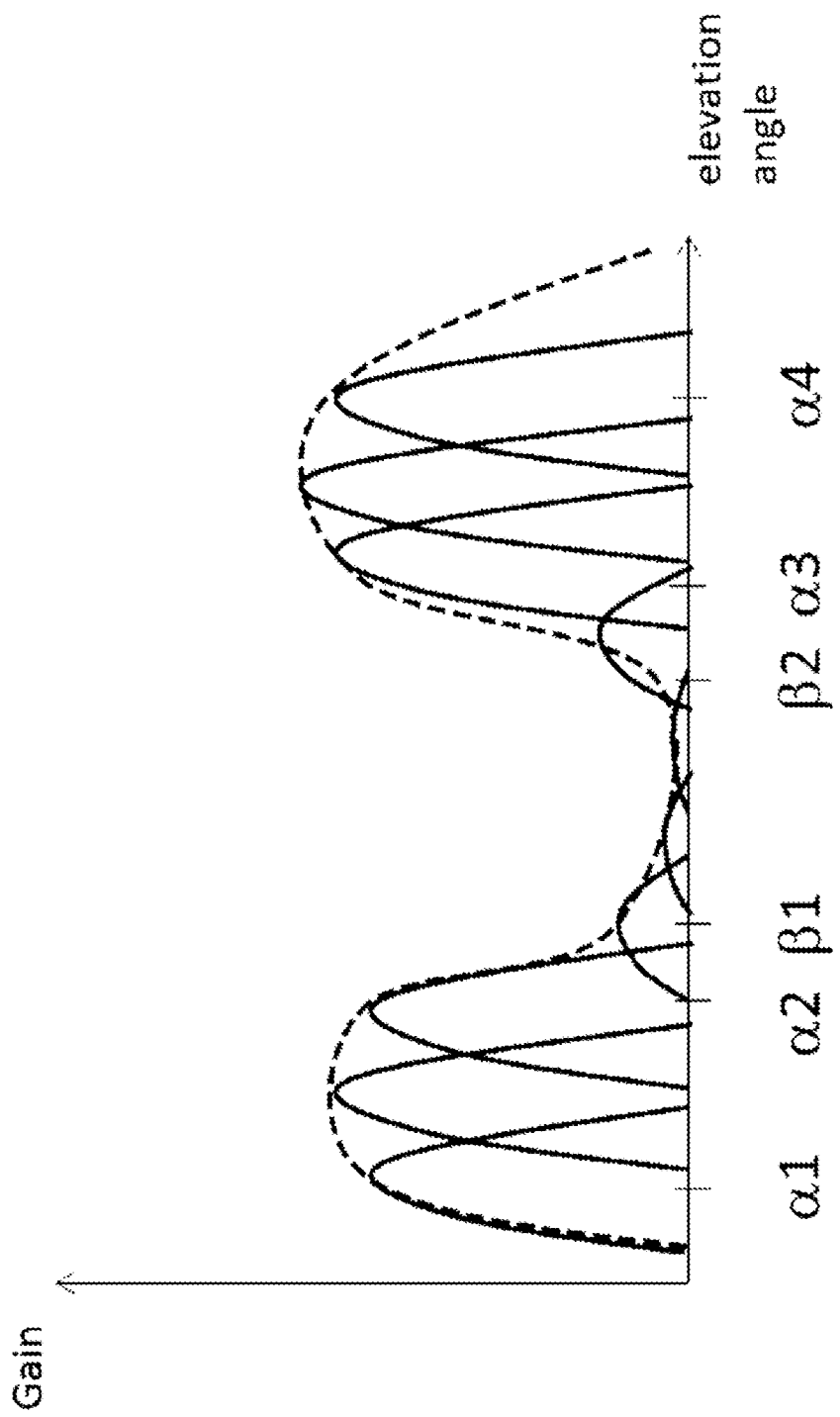
FIG. 21 shows an angular profile.

As can be seen by using this codebook, the desired objective may not be met, since it emits high power in the interval from beta1 to beta2. In one variant an individual power scaling is therefore applied to each beam such that the transmitted beams are scaled in power according to the designed cell selection beam. This power scaling will result in that the angular maximum-power profile of the cell selection beam is matched with the angular maximum-power profile of the data transmission beams in the sense that the angular maximum-power profile of the cell selection beam is substantially similar to the angular maximum-power profile of the data transmission beams. This is illustrated in FIG. 21.

There may be considered to carry out an angular-dependent power scaling using antenna port virtualization; the antenna port virtualization may be performed to match the angular maximum-power profiles (maximum power level masks) of the cell selection beam and/or the data-transmission beams. Consider for instance a particular embodiment with a vertical antenna array with N equi-spaced (single or dual polarized) subelements. The subelements may be partitioned into groups, e.g. disjoint or separate groups, of M adjacent subelements (for each polarization). Virtual antenna ports may be created using a single set of M virtualization weights applied on each group of subelements (wherein each one of the weights may be applied and/or associated to one of the elements of a group). The effect of such a virtualization is to create a virtual antenna with N/M vertical "virtual antenna subelements". The virtual subelement separation in this case corresponds to M times the physical subelement separation.

Figure 20:
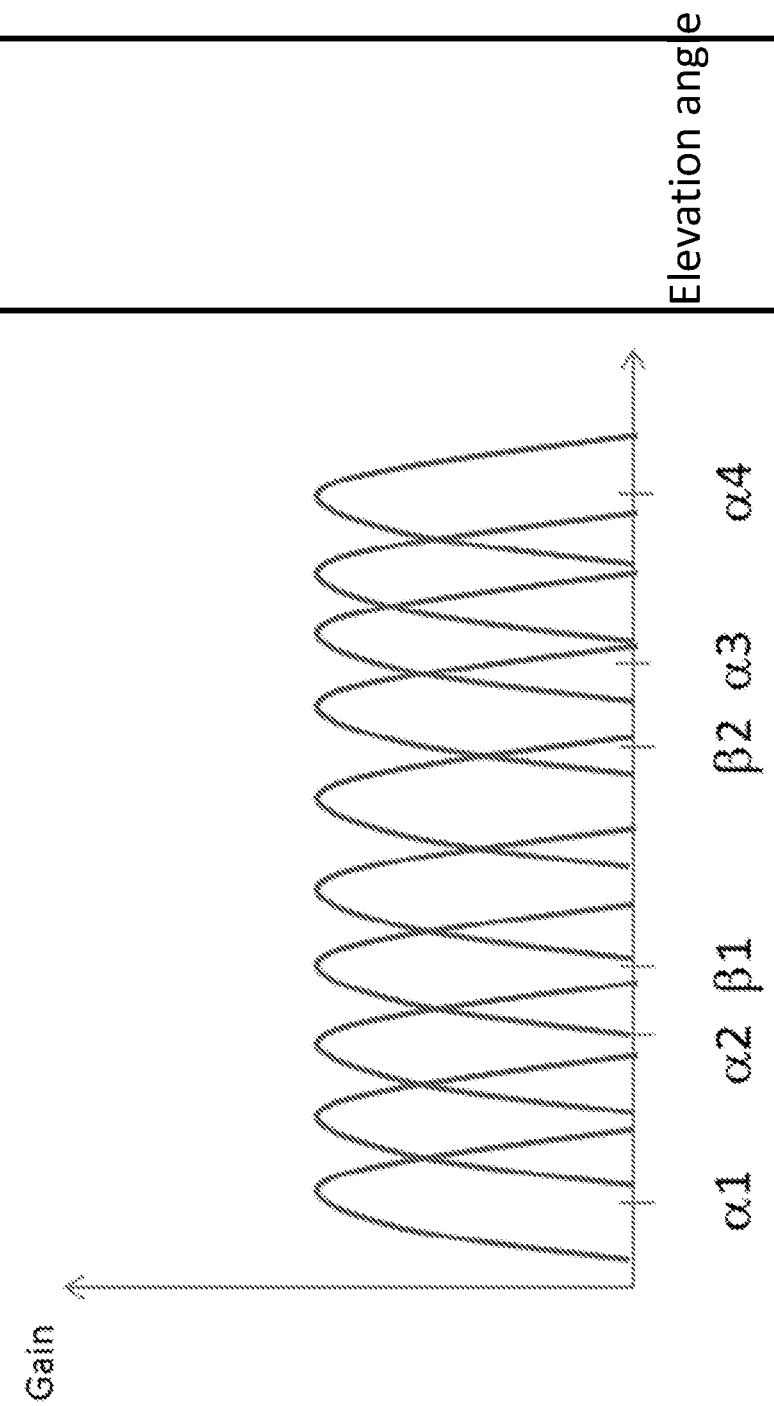
FIG. 20 shows an angular profile.

Assuming initially that the virtual subelements are isotropic (i.e., their antenna pattern is flat), a precoder codebook applied on the virtual antenna ports may have beams as illustrated FIG. 20, with main lobes both in the desired angular ranges alpha1 to alpha2 and alpha3 to alpha4, but also in the restricted interval beta1 to beta2.

For non-isotropic virtual subelements, the subelement antenna pattern will have a multiplicative effect on the angular maximum-power profile of the codebook of data transmission beams. Hence, if this angular power profile is essentially flat for isotropic subelements, it will essentially follow the virtual subelement antenna pattern for non-isotropic subelements.

Utilizing data transmission beams in compliance with a cell selection beam (thereby also complying with specifications of high or low power transmission in different angular intervals) may hence be reduced to the task of shaping antenna patterns of virtual antenna ports to be essentially similar to the cell selection beam. This is performed by properly selecting the M virtualization weights of the virtual port. For example, when M is a multiple of 2 (and N is a multiple of M) setting half of the virtualization weights to 1 and half to −1 (=180° phase shift) is sufficient to ensure that the virtual antenna pattern has a null towards the horizon (assuming no mechanical tilt of the antenna). Additionally or optionally, the physical antenna subelement spacing may be a design parameter that can be used to further shape the virtual antenna pattern.

If a virtual antenna pattern has been designed to comply with the specifications of high or low power transmission in different angular intervals, it is possible to directly align the angular maximum-power profiles of the cell selection beam and the data transmission beams by using the very same virtual ports for both kinds of beams. Alternatively, differently virtualized ports may be used for the cell selection beam and the data transmission beams, in particular such that the different virtual antenna patterns are substantially similar, which in turn makes the angular maximum-power profiles substantially similar.

It should be pointed out that although the previous variant described that the angular maximum-power profile of the cell selection beam is substantially similar to the angular maximum-power profile of the data transmission beams the discussed approach does not require that their magnitude is in the same order. Only the shape of these curves needs to be substantially similar; in one variant when comparing said angular maximum-power profiles they may be amplitude-normalized (i.e. linearly scaled) so that their respective maximum magnitude is set to one. That the curves are of different order of magnitude is typically the case in UE specific elevation beamforming where the cell selection beam in general needs to be wide, hence it will spread its power in many directions, and the data transmission beam is narrow in order to focus the emitted power in one specific direction. Therefore, in such a case, the emitted power in a certain angle is typically larger from the data transmission beam than from the cell selection beam.

In another variant data transmission beams with its mainlobe within the interval beta1 to beta2 are scaled down by applying a power scaling. In another variant beams with its mainlobe within the interval beta1 to beta2 are effectively removed from the codebook, which is thus limited; this can be done by for instance using codebook subset restriction where the eNodeB is able to inform the UE about a set of codewords that are not allowed to be used.

In another variant the eNodeB does not generate beams based on a codebook but is instead able to estimate suitable beams to use based on for instance uplink measurements. Also in this case the variants of scaling down the power or to not allow certain directions are applicable. For example, the eNodeB may estimate a main propagation direction within the interval beta1 to beta2 to a UE based on uplink measurements and then choose to use a beam with the mainlobe outside said interval (e.g. in any of the two other intervals). This despite that it would at first sight seem to be best to direct the main lobe in the same direction as the main propagation direction to the UE.

Finally it is pointed out that the previous presented variants on how to utilize the data transmission beams in order to fulfil the requirements on transmitting low power in a set of intervals and a high power in another set of intervals are equally applicable when designing the cell selection by using multiple beams. In this case we only need to replace the data transmission beams, in previous variants, with cell selection beams.

It is also pointed out that although previous variants were presented in the context of UE specific elevation beamforming they are equally applicable for UE specific joint elevation and azimuth beamforming. Here one would instead identify two dimensional areas which would correspond to the one dimensional intervals of type (A) or type (B). The cell selection as well as the data transmission would then be carried out such that the two dimensional angular maximum-power profile of the cell selection beam(s) is substantially similar to the two dimensional angular maximum-power profile of the data transmission beams. Both these angular maximum-power profiles will furthermore correspond to low power in the area corresponding to area (B) and high power in the area corresponding to area (A).

Some disclosed embodiments comprise:

A1 There may be considered a UE specific elevation beamforming system by letting a node (e.g. transmitter arrangement and/or eNodeB) constrain, from above, an angular power profile for data transmission within an angular interval (1) by imposing constraints on the set of data transmission beams.

A2 as A1, where the interval (1) includes the horizon.

A3 as A1, where a node also constrains from below an angular power profile for data transmission on one or more intervals of a second kind (2).

A4 as A3, where an angular power profile for data transmission is constrained to correspond to significantly higher power on at least two intervals (2) than on the interval (1).

A5 as A4, where two intervals (2) are separated by the interval (1).

A6 as A1, where codebook subset restriction was used for the data beams in order to constrain an angular power profile for data transmission in the interval (1).

A7 as A1, where the output power was reduced for some data beams in order to constrain an angular power profile for data transmission in the interval (1).

Alternatively or additionally, there may be considered a method of operating a transmitter arrangement, in particular a base station or eNodeB, the transmitter arrangement being adapted for beamforming, in particular elevation beamforming and/or beamforming for data transmissions, the method comprising:

(optionally) determining a critical angular interval, in particular in elevation angle, wherein the critical angular interval may be determined based on and/or may be dependent on a deployment analysis of the transmitter arrangement and/or may include the horizon or a horizontal angle;

determining a maximum power level mask for the power of transmission and/or beams in a critical angular interval, the maximum power level mask covering at least the critical angular interval (determining the maximum power level mask and determining the critical angular interval may be performed in one, as the maximum power level mask may indicate the critical angular interval);

(optionally) determining a minimum power level mask for the power of transmission and/or beams for a, or at least a part of a, serviced angular interval, which may cover and/or include the critical angular interval;

(optionally) determining the (e.g. angular) position of a receiving device like a terminal or user equipment;

controlling beamforming based on the maximum power level mask (wherein controlling beamforming may be performed based on the minimum power level mask); the maximum power level mask and/or minimum power level mask may be determined and/or utilized for controlling beamforming for and/or in the context of data transmissions; controlling beamforming may be performed based on the position of a receiving device.

There may be considered a method of providing information for a transmitter arrangement, e.g. a transmitter arrangement as described herein, the method comprising any one or any combination of:

(optionally) determining a critical angular interval, in particular in elevation angle, wherein the critical angular interval may be determined based on and/or may be dependent on a deployment analysis of the transmitter arrangement and/or may include the horizon or a horizontal angle;

(optionally) determining a serviced angular interval, in particular in elevation angle, wherein the serviced angular interval may be determined based on and/or may be dependent on a deployment analysis of the transmitter arrangement and/or may include the horizon or a horizontal angle;

(optionally) determining a (first) maximum power level mask for the power of transmission and/or beams in a critical angular interval, the maximum power level mask covering at least the critical angular interval (determining the maximum power level mask and determining the critical angular interval may be performed in one, as the maximum power level mask may indicate the critical angular interval);

determining the (first) maximum power level mask may be performed for data transmission and/or corresponding beams;

(optionally) determining a (second) maximum power level mask for the power of transmission and/or beams in a critical angular interval, the maximum power level mask covering at least the critical angular interval (determining the maximum power level mask and determining the critical angular interval may be performed in one, as the maximum power level mask may indicate the critical angular interval); determining the (second) maximum power level mask may be performed for cell selection transmission and/or corresponding beams;

(optionally) determining a minimum power level mask for the power of transmission and/or beams for a, or at least a part of a, serviced angular interval, which may cover and/or include the critical angular interval; determining the minimum power level mask may be performed for data transmission and/or corresponding beams)

Alternatively or additionally, there may be considered (B1) a method for operating a transmitter arrangement, wherein an angular maximum-power profile of cell selection beam(s) provided by the transmitter arrangement is substantially similar to the angular maximum-power profile of the data transmission beams. Both these angular maximum-power profiles may furthermore correspond to low power in at least one (certain) interval, which may be a critical angular interval, and may be high in at least one interval disjoint from the first interval(s)/the critical angular interval.

Some embodiments described are:

B2 as B1, where said first interval includes the horizon

B3 as B1, where there is only one cell selection beam

B4 as B1, where codebook subset restriction was used for the data transmission beams in order ensure low power in said first interval.

B5 as B1, where the output power was reduced for some data transmission beams in order to ensure low power in said first interval B6 as B1, where the output power was reduced for some cell selection beams in order to ensure low power in said first interval Alternatively or additionally, there may be considered a method for operating a transmitter arrangement, in particular a base station or eNodeB, the transmitter arrangement being adapted for beamforming, in particular elevation beamforming and/or beamforming for data and/or cell selection transmissions, the method comprising:

(optionally) determining the (e.g. angular) position of a receiving device like a terminal or user equipment;

controlling beamforming for at least one data transmission beam based on a first maximum power level mask for data transmission and for at least one cell selection beam based on a second maximum power level mask for cell selection transmission; wherein the first maximum power level mask and the second maximum power level mask each have a gap and/or significant drop in a critical angular interval; controlling beamforming may be performed based on the position of a receiving device. The method may comprise determining a critical angular interval and/or the first maximum power level mask and/or determining the second maximum power level mask.

Alternatively or additionally, there may be considered a transmitter arrangement, in particular a base station or eNodeB, the transmitter arrangement being adapted for beamforming, in particular elevation beamforming and/or beamforming for data and/or cell selection transmissions. The transmitter arrangement may optionally be adapted for, and/or comprise a location determining module for, determining the (e.g. angular) position of a receiving device like a terminal or user equipment.

The transmitter arrangement is adapted for, and/or comprises a beamforming controlling module for, controlling beamforming for at least one data transmission beam based on a first maximum power level mask for data transmission and for at least one cell selection beam based on a second maximum power level mask for cell selection transmission; wherein the first maximum power level mask and the second maximum power level mask each have a gap and/or significant drop in a critical angular interval. The transmitter arrangement and/or the beamforming controlling module may further be adapted for controlling beamforming based on the determined (e.g. angular) position. The transmitter arrangement may be adapted for, and/or comprise an interval determining module, for determining a critical angular interval; and/or may be adapted for, and/or comprise a first mask determining module for, determining the first maximum power level mask.

Alternatively or additionally, the transmitter arrangement may be adapted for, and/or comprise a second mask determining module, for determining the second maximum power level mask.

The first maximum power level mask and the second maximum power level mask may be significantly and/or substantially similar, e.g. in shape and/or maximum power level. Significantly or substantially similar may refer to the masks being scalable (in particular linear scalable in power level and/or magnitude) to essentially cover each over. The masks may in particular be considered to be significantly similar if they cover each over (e.g. after a linear scaling) with a deviation within a predetermined corridor, the corridor being defined to cover and/or surround one of the maximum power profiles defined by one of the mask plus a deviation of 30% or 20% or 10% at each point of the profile. The mask may cover at least one common angular region or interval; similarity may be defined for a common angular region or interval.

There may be considered a transmitter arrangement for a wireless communication network, in particular a base station or eNodeB, the transmitter arrangement being adapted for, and/or comprising a beamforming module for, beamforming, in particular elevation beamforming and/or beamforming for data transmissions. The transmitter arrangement may optionally be adapted for, and/or comprise a critical angular interval determining module for, determining a critical angular interval, in particular in elevation angle, wherein the critical angular interval may be determined based on and/or be dependent on a deployment analysis of the transmitter arrangement and/or may include the horizon or a horizontal angle;

wherein the transmitter arrangement may be adapted for, and/or comprise a maximum mask determining module for, determining a maximum power level mask for the power of transmission and/or beams in a critical angular interval, the maximum power level mask covering at least the critical angular interval;

wherein the transmitter arrangement optionally may be adapted for, and/or comprise a minimum mask determining module for, determining a minimum power level mask for the power of transmission and/or beams for at least a part of a serviced angular interval, which may cover and/or include the critical angular interval;

wherein the transmitter arrangement may optionally be adapted for, and/or comprise a location determining module for, determining the (e.g. angular) position of a receiving device like a terminal or user equipment;

wherein the transmitter arrangement is adapted for, and/or may comprise a beamforming controlling module for, controlling beamforming based on the maximum power level mask (wherein controlling beamforming may be performed based on the minimum power level mask); the maximum power level mask and/or minimum power level mask may be determined and/or utilized for controlling beamforming for and/or in the context of data transmissions. The transmitter arrangement and/or the beamforming controlling module may further be adapted for controlling beamforming based on the determined (e.g. angular) position.

There may be considered a transmitter arrangement adapted to perform any one of the methods for operating a transmitter arrangement disclosed herein.

There is also disclosed a program product comprising code executable by control circuitry, the code causing the control circuitry to carry out and/or control any one of the method for operating transmitter arrangement as described herein, in particular if executed on control circuitry, which may be control circuitry of a transmitter arrangement as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium (or storage) may comprise at least one of a memory, which may be volatile or non-volatile, a buffer, a cache, an optical disc, magnetic memory, flash memory, etc.

A cell selection beam may be a beam based on which a receiving device like a terminal or UE may decide which cell to choose for communication and/or to use as primary cell and/or to which transmitter arrangement or base station or eNodeB to associate itself for communication. A cell selection beam may provide pilot and/or control signaling, e.g. to enable registering and/or synchronizing with the cell. A data beam may be a beam transmitting data, in particular user/payload data. A data beam may be utilized to transmit data to the receiving device (e.g., terminal or UE), after it has decided, based on a cell selection beam, to register with the corresponding transmitter arrangement. Cell selection transmission may refer to transmission of one or more cell selection beams. Data transmission may refer to transmission of at least one data transmission beam.

A maximum power level mask may be a maximum power profile or distribution, which may determine or indicate a maximum power of a beam or transmission at a given angle and/or within a specified angular interval, in particular an elevation angle. Generally, a maximum power level mask may define a global maximum power, which may be the highest level of transmission power admissible into any angle covered by the mask. It may be considered that the maximum power level mask defines a gap and/or significant drop of power level between the borders of the critical angular interval and a region between the borders, e.g. a region in the middle between the borders. Alternatively or additionally, it may be considered that the maximum power level mask defines a gap and/or significant drop of power level between a global maximum power and a region between of minimal power in the critical angular interval, e.g. a region in the middle of the interval. A gap or significant drop may indicate a maximum power level defined by the mask dropping by at least 30%, at least 40% or at least 50%. A maximum power level mask may cover at least a critical angular interval; it may be considered that a maximum power mask covers one or more intervals within a serviced angular interval and/or a or at least part of a serviced angular interval.

A minimum power level mask may be a minimum power profile or distribution, which may determine or indicate a minimum power of a beam or transmission at a given angle and/or within a specified angular interval, in particular an elevation angle. A minimum power level mask may cover at least a critical angular interval; it may be considered that a minimum power mask covers one or more intervals within a serviced angular interval and/or a or at least part of a serviced angular interval.

A critical angular interval may generally indicate an angular interval (in particular in elevation) with a risk of interference by transmissions from the transmitter arrangement into the critical angular interval considered to be significant, in particular according to a deployment analysis and/or predetermined parameters, which may depend on, and/or include, a power level of transmissions and/or an analysis (which may be statistical) of likelihood/relevance of interference in particular of receiving devices/UEs not serviced by the transmitter arrangement, and/or relative received power levels at locations between two transmitter arrangements, and/or geographical and/or topographical and/or architectonic analysis. The critical angular interval may be defined by two angles beta1, beta2, which may be defined relative to a horizontal axis; of course, other parametrisations are possible. The critical angular interval may generally be determined based on and/or be dependent on the deployment and/or a deployment analysis of the transmitter arrangement. A critical angular interval may be within a serviced angular interval.

A serviced angular interval may described an angular interval in which receiving devices like terminals and/or UEs are expected or expectable, in particular expected to be present with a given likelihood. The serviced angular interval may be determined based on and/or be dependent on the deployment and/or a deployment analysis of the transmitter arrangement.

The (angular) position of a receiving device may be determined based on signals from the receiving device, e.g. based on GPS location information, and/or based on fingerprinting and/or stored location data and/or based on runtime analysis of the signals. The angular position may represent the angle the maximum/minimum angular power mask is defined for.

Controlling beamforming based on a power level mask (maximum power level mask and/or minimum power level mask) may generally refer to controlling beamforming/beamformed transmission by the transmitter arrangement such that the power level transmitted in an angle confirms to the constraints (maximum and/or minimum) defined by the mask. For example, to cover a receiving device in the critical angular interval, a transmission power may be lowered (in particular if sweeping/switched beams are used) and/or a beam may be chosen which at a given maximum power (which may be higher than the maximum in the critical angular interval, but may be directed away from this interval) provides a power in the critical angular interval which is below the maximum prescribed by the mask; such may e.g. be effected by a sidelobe of a beam having lower maximum power than a main beam it is associated to. Generally, a codebook selection may be limited to control beamforming based on a power level mask, in particular based on a maximum power level mask. The limitation may limit and/or restrict the beams available for transmission into the critical angular interval.

Generally, beamforming may be performed based on a codebook providing a set of possible beams to be provided. The codebook may be modified, e.g. when controlling beamforming, based on a maximum power level mask and/or a minimum power level mask, in particular depending on the angular position (which may be an elevation angular position) of a target receiving device like a terminal or user equipment. Alternatively or additionally, beam forming may be performed utilizing antenna virtualization and/or antenna port virtualization.

Antenna port virtualization may comprise transforming and/or associating and/or mapping and/or connecting physical subelements of an antenna or antenna arrangement and/or separate antenna elements of an antenna or antenna arrangement (e.g., N elements or subelements of the antenna or antenna arrangement) into different groups (in particular, separate or disjoint groups without common elements in the groups), wherein each group may comprise a number of physical elements or subelements, e.g. M. Each group may comprise the same number of elements or subelements. A separate antenna element and/or subelement may be separately controllable and/or be provided with a separate feed signal and/or provide a separate reception signal separately or independent from other elements or subelements.

A signal to a virtual antenna port (and/or one of the groups) may be mapped to the physical antenna elements or subelements based on virtualization weights, which may represent a phase shift and/or amplitude or amplitude scaling each. To each group there may be associated M weights. The weights may be represented as complex weights and/or be mapped to an antenna element or subelement or port, in particular linearly mapped. It may be considered that each weight is associated to one physical antenna element or subelement or associated (physical) port (in particular, that each weight is associated to exactly one (physical) port or element or subelement, and/or that to each antenna element or subelement or (physical) port there is associate one weight). To each group there may be assigned and/or associated a common virtualized antenna port, which may be provided with a common feed signal (or tapped for a common reception signal), e.g. for data transmission. The weights may be chosen to set and/or control a first number of (physical) elements or subelements in a group to have a phase shift opposite to and/or shifted by 180 degrees relative to the phase shift of a second number of (physical) elements or subelements, wherein the first number may be equal to the second number and/or each element or subelement of the first number may be associated to and/or have a corresponding one of the second number; the total phase shift (added over a group) may be zero or close to zero.

For example, the weights for the first number of elements or subelements may be 1 or I, and the weights for the second number of elements or subelements may be −1 or −I. The weights may be adapted according to operational conditions, in particular to adapt for mechanical antenna tilt. The antenna arrangement may be a vertical antenna arrangement and/or comprise and/or comprise of vertically arranged (physical) antenna elements or subelements; generally, each antenna element or subelement may comprise or be a longitudinally extending and/or straight line element or wire element; the longitudinal axes of the line or wire elements may be parallel. The antenna or antenna arrangement may be shifted from a vertical arrangement by a mechanical tilt, which may be corrected for by suitable choice of weights. It may be considered that antenna port virtualization for cell selection is the same or different from antenna port virtualization for data transmission, e.g. regarding the mapping of elements or subelements into groups.

Antenna port virtualization may be performed to perform beam forming such that a maximum power level mask and/or a minimum power level mask is/are conformed to and/or beamforming is controlled based on such mask/s. A transmitter arrangement and/or a transmitter and/or a beamforming module may comprise an antenna port virtualization module for performing antenna port virtualization, which may be part of and/or connected to a beamforming module. Generally, control circuitry and/or transmit circuitry and/or antenna circuitry of a transmitter arrangement and/or transmitter may be adapted to control and/or perform antenna port virtualization. Any one of the methods, in particular methods for operating a transmitter arrangement, described herein and/or beamforming and/or controlling beamforming, e.g. based on one or more than one power masks and/or cell selection beamforming and/or data transmission beamforming) may comprise antenna port virtualization. Any of the transmitters or transmitter arrangements described herein may comprise a module and/or circuitry for, and/or be adapted for, performing antenna port virtualization, in particular for cell selection beamforming and/or data transmission beamforming, and/or in the context of beamforming.

Determining an angular interval, in particular a critical angular interval (e.g., by a transmitter arrangement), may comprise obtaining the interval (or corresponding data representing the interval), e.g. by reading from a storage or memory and/or receiving, e.g. from a network. Such an interval may be predetermined, e.g. as described herein, and stored in a suitable memory. Alternatively or additionally, an angular interval may be determined and/or updated during operation, e.g. based on measurements performed during operation and/or communication with receiving devices, e.g. terminals or UEs. For example, a serviced angular interval may be updated if it is measured and/or determined that a receiving devices requests service from an angular position hitherto not within the serviced angular interval.

Determining a mask, in particular a maximum power level mask, (e.g., by a transmitter arrangement), may comprise obtaining the mask (or corresponding data representing the interval), e.g. by reading from a storage or memory and/or receiving, e.g. from a network. Such a mask may be predetermined, e.g. as described herein based on a deployment analysis, and stored in a suitable memory. Alternatively or additionally, a mask may be determined and/or updated during operation, e.g. based on measurements performed during operation and/or communication with receiving devices, e.g. terminals or UEs. It should be noted that determining a mask, in particular a maximum power level mask, may include determining a critical angular interval, which may be derivable/included in the data defining the mask. Determining a mask may generally be based on inference conditions, e.g. represented by measurement values and/or parameters indicating SIR and/or SINR and/or SNR.

Elevation beamforming may generally refer to beamforming in a vertical direction and/or at least including a vertical direction. Cell selection beamforming may refer to beamforming for cell selection and/or forming cell selection beams. Data transmission beamforming may refer to beamforming for data transmission and/or forming data transmission beams.

Figure 22:
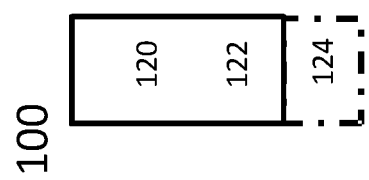
FIG. 22 schematically shows a network node.

FIG. 22 schematically show a transmitter arrangement or base station 100, which in particular may be an eNodeB. Network node 100 comprises control circuitry 120, which may comprise a controller connected to a memory. The control circuitry is connected to control radio circuitry 122 of the network node 100, which provides receiver and transmitter and/or transceiver functionality and/or may implement beamforming control functionality. An antenna circuitry 124 may be connected or connectable to radio circuitry 122 for signal reception or transmittance and/or amplification. In particular, the antenna circuitry 124 comprises an antenna array adapted and/or controllable, e.g. by control circuitry and/or radio circuitry, for beamforming. The transmitter arrangement 100 may be adapted to carry out any of the methods for operating a transmitter arrangement disclosed herein; in particular, it may comprise corresponding circuitry, e.g. control circuitry. Any module of the transmitter arrangement may be implemented in and/or executable by the control circuitry 120 and/or radio circuitry 122 and/or antenna circuitry 124.

Figure 23:
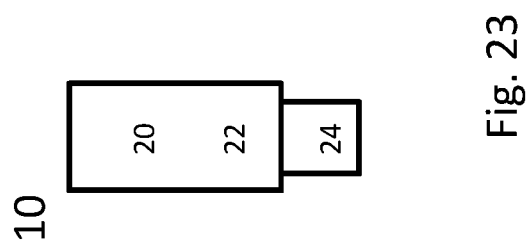
FIG. 23 shows a user equipment or receiving device.

FIG. 23 schematically shows a user equipment 10. User equipment 10 comprises control circuitry 20, which may comprise a controller connected to a memory. Any module of a user equipment may implemented in and/or executable by, user equipment, in particular the control circuitry 20. User equipment 10 also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for cellular communication and/or D2D communication, in particular utilizing E-UTRAN/LTE resources as described herein. The user equipment 10 may be adapted to carry out any of the methods for operating user equipment and/or a transmitter arrangement disclosed herein; in particular, it may comprise corresponding circuitry, e.g. control circuitry. Transmitting by such a user equipment may comprise transmitting one or more UL carriers.

Figure 24:
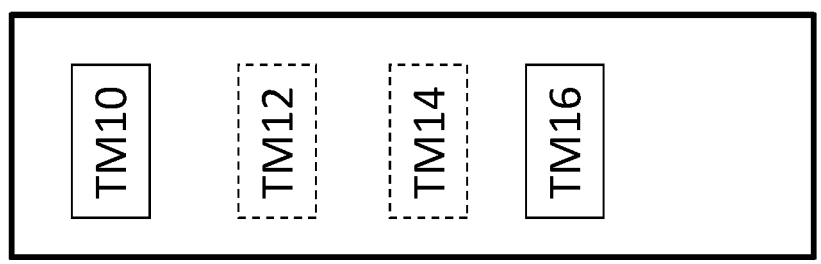
FIGS. 24 (a) and (b) show a method for operating a transmitter arrangement and a transmitter arrangement, respectively.
Figure 24:
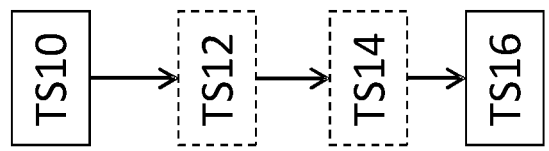

FIG. 24 (a) shows an example of a method of operating a transmitter arrangement for a wireless communication network, wherein the transmitter arrangement may be any transmitter arrangement described herein, in particular it may be adapted for beamforming. The method comprises an action TS10 of determining a maximum power level mask for the power of transmission and/or beams in a critical angular interval, the maximum power level mask covering at least the critical angular interval. The method further may comprise an optional action TS12 of indicating a restricted codebook to a user equipment (or generally, a receiving device), wherein the restricted codebook may be determined based on the maximum power level mask. The method may comprise an optional action TS14 of receiving a recommendation, which may be based on a restricted codebook. An action TS16 may comprise controlling beamforming based on the maximum power level mask, and may, if applicable, also be based on a recommendation.

FIG. 24 (b) shows an example of a transmitter arrangement, which may be any transmitter arrangement as described herein. The transmitter arrangement may comprise a determining module TM10 for performing action TS10. Optionally, the transmitter arrangement may comprise an indicating or transmitting module TM12 for performing action TS12 and/or a receiving module TM14 for performing action TS14. Moreover, the transmitter arrangement comprises a controlling or beamforming module TM16 for performing action TS16.

Figure 25:
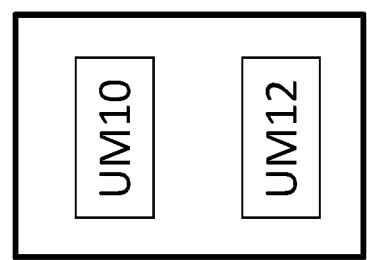
FIGS. 25 (a) and (b) show a method for operating a user equipment or receiving device and user equipment or receiving device, respectively.
Figure 25:
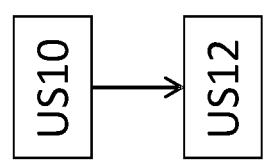

FIG. 25 (a) shows an example of a method of operating a receiving device like a user equipment, which may be any receiving device or user equipment described herein. The method may comprise an action US10 of receiving an indication of a restricted codebook and an action US12 of transmitting a recommendation for beamforming to the network, the recommendation being based on the restricted codebook.

FIG. 25 (b) shows an example of a receiving device like a user equipment, which may be any receiving device or user equipment described herein. The receiving device or user equipment may comprise a receiving module UM10 form performing action US10 and an transmitting module UM12 for performing action US12.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA.

A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or base station and/or relay node and/or any device generally adapted for communication in a wireless communication network, in particular cellular communication. In this context, a transmitter arrangement as described herein may be considered a node of a network.

A cellular network may comprise a network node (which may be a transmitter arrangement), in particular a radio network node, which may be connected or connectable to a core network, e.g. a core network with an evolved network core, e.g. according to LTE. A network node may e.g. be a base station or eNodeB. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A receiving device may be implemented as a terminal, in particular a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that receiving device like a terminal or a user equipment is adapted for one or more RATs, in particular LTE/E-UTRA. It may be considered that a receiving device like a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN.

Modifying a codebook may generally comprise restricting a codebook. Restricting a codebook may comprise removing one or more beams from a codebook, and/or moving (e.g., in elevation or horizontal angle) and/or scaling down the power/amplitude of one or more beams in the codebook. The codebook modified or restricted may be a pre-determined codebook, which e.g. may be based on a standard. A restricted codebook may be a codebook that resulted and/or is based on a codebook (a predetermined codebook) that was subjected to modifying/restricting.

ABBREVIATION EXPLANATION

3GPP $3^{rd}$ Generation Partnership Project

Ack/Nack Acknowledgment/Non-Acknowledgement, also A/N

AP Access point

B1, B2, . . . Bn Bandwidth of signals, in particular carrier bandwidth Bn assigned to corresponding carrier or frequency f1, f2, . . . , fn BER/BLER Bit Error Rate, BLock Error Rate;

BS Base Station

CA Carrier Aggregation

CoMP Coordinated Multiple Point Transmission and Reception

CQI Channel Quality Information

CRS Cell-specific Reference Signal

CSI Channel State Information

CSI-RS CSI reference signal

D2D Device-to-device

DL Downlink

EPDCCH Enhanced Physical DL Control CHannel

DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)

eNB evolved NodeB; a form of base station, also called eNodeB

E-UTRA/N Evolved UMTS Terrestrial Radio Access/Network, an example of a RAT f1, f2, f3, . . . , fn carriers/carrier frequencies; different numbers may indicate that the referenced carriers/frequencies are different f1_UL, . . . , fn_UL Carrier for Uplink/in Uplink frequency or band f1_DL, . . . , fn_DL Carrier for Downlink/in Downlink frequency or band FDD Frequency Division Duplexing ID Identity L1 Layer 1
L2 Layer 2
LTE Long Term Evolution, a telecommunications standard
MAC Medium Access Control
MBSFN Multiple Broadcast Single Frequency Network
MDT Minimisation of Drive Test
NW Network
OFDM Orthogonal Frequency Division Multiplexing
O&M Operational and Maintenance
OSS Operational Support Systems
PC Power Control
PCFICH Physical Control Format Indicator Channel
PDCCH Physical Downlink Control Channel
PUSCH Physical Uplink Shared Channel
PUCCH Physical Uplink Control Channel
PH Power Headroom
PHR Power Headroom Report
PSS Primary Synchronization Signal
PUSCH Physical Uplink Shared CHannel
R1, R2, . . . , Rn Resources, in particular time-frequency resources, in particular assigned to corresponding carrier f1, f2, fn
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINR/SNR Signal-to-Noise-and-Interference Ratio; Signal-to-Noise Ratio
SIR Signal-to-Interference Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions.

The invention claimed is:

1. A method of operating a transmitter arrangement for a wireless communication network, the transmitter arrangement being adapted for beamforming, the method comprising:
determining a cell selection beam having an emitted power within a critical angular interval being lower than the emitted power outside the critical angular interval, thereby creating an angular maximum-power profile of the cell selection beam;
determining a maximum power level mask for the power of transmission and/or beams in the critical angular interval by matching the angular maximum-power profile of the cell selection beam with an angular maximum-power profile of the power of transmission and/or beams, the maximum power level mask covering at least the critical angular interval; and
controlling beamforming based on the maximum power level mask.

2. The method according to claim 1, wherein controlling beamforming is based on a codebook.

3. The method according to claim 1, wherein controlling beamforming is based on a restricted codebook, wherein the restricted codebook is determined based on the maximum power level mask.

4. The method according to claim 1, further comprising indicating a restricted codebook to a user equipment.

5. The method according to claim 1, wherein controlling beamforming is based on a recommendation received from a user equipment, wherein the recommendation is based on a restricted codebook.

6. A transmitter arrangement for a wireless communication network, the transmitter arrangement being adapted for beamforming, the transmitter arrangement further being adapted for:
determining a cell selection beam having an emitted power within a critical angular interval being lower than the emitted power outside the critical angular interval, thereby creating an angular maximum-power profile of the cell selection beam;
determining a maximum power level mask for the power of transmission and/or beams in the critical angular interval by matching the angular maximum-power profile of the cell selection beam with an angular maximum-power profile of the power of transmission and/or beams, the maximum power level mask covering at least the critical angular interval; and
controlling beamforming based on the maximum power level mask.

7. The transmitter arrangement according to claim 6, wherein controlling beamforming is based on a codebook.

8. The transmitter arrangement according to claim 6, wherein controlling beamforming is based on a restricted codebook, wherein the restricted codebook is determined based on the maximum power level mask.

9. The transmitter arrangement according to claim 6, the transmitter arrangement further being adapted for indicating a restricted codebook to a user equipment.

10. The transmitter arrangement according to claim 6, wherein controlling beamforming based on a recommendation received from a user equipment, wherein the recommendation is based on a restricted codebook.

* * * * *